US006720876B1

(12) United States Patent
Burgess

(10) Patent No.: US 6,720,876 B1
(45) Date of Patent: Apr. 13, 2004

(54) UNTETHERED POSITION TRACKING SYSTEM

(75) Inventor: David A. Burgess, Fairfield, CA (US)

(73) Assignee: Interval Research Corporation, Palo Alto, CA (US)

( * ) Notice: Subject to any disclaimer, the term of this patent is extended or adjusted under 35 U.S.C. 154(b) by 20 days.

(21) Appl. No.: 10/076,938

(22) Filed: Feb. 14, 2002

(51) Int. Cl.[7] .................................................. G08B 13/14
(52) U.S. Cl. .............................. 340/568.1; 340/539.13; 340/10.1; 340/3.51; 340/505
(58) Field of Search .......................... 340/568.1, 539.13, 340/10.1, 573.1, 3.51, 325.36, 505, 825.49, 988, 992, 994; 342/357, 463, 357.07; 367/903, 904, 197–199

(56) References Cited

U.S. PATENT DOCUMENTS

| 5,495,427 A | | 2/1996 | Puma et al. | ................. 364/516 |
| 5,574,467 A | | 11/1996 | Saunders | ..................... 342/398 |
| 5,920,278 A | * | 7/1999 | Tyler | ............................ 342/33 |
| 6,348,856 B1 | * | 2/2002 | Jones | ........................ 340/10.1 |
| 6,473,619 B1 | * | 10/2002 | Kong | ........................... 340/988 |

* cited by examiner

Primary Examiner—Anh La

(74) Attorney, Agent, or Firm—Van Pelt & Yi LLP

(57) ABSTRACT

The invention can enable the position (i.e., location and/or orientation) of one or more untethered objects to be tracked. One or more transmitters, each of which has a fixed and known positional relationship to a corresponding object, each emit a sequence of position tracking signals. Each transmitter can emit a unique, identifiable position tracking signal so that the transmitter (and the object to which the transmitter is coupled) from which a signal was emitted can be identified, thereby enabling the position of multiple objects to be tracked. Multiple receivers receive the position tracking signals emitted by each transmitter. The receivers record the times at which signals are received. These recorded times can be communicated to a controller, which can determine from the recorded times the location of each object at a time that a position tracking signal was emitted from the corresponding transmitter. If multiple transmitters are coupled to each object, the orientation of the object can be determined in addition to the location. The position tracking signals can advantageously be ultrasonic signals, which require relatively little power, thus enabling the transmitters to be embodied in a physically small device, so that correspondingly small objects can be tracked. The invention can be used to track objects in small and medium-scale tracking spaces and can be adapted to track the position of an object or objects in one, two or three dimensions. An inertial device can be added to the object, in addition to the transmitter, to enhance the tracking of the object's location.

4 Claims, 11 Drawing Sheets

UNTETHERED POSITION TRACKING SYSTEM

BACKGROUND OF THE INVENTION

1. Field of the Invention

This invention relates to tracking the position of one or more untethered objects.

2. Related Art

The ability to track the location and/or orientation of an object (sometimes referred to herein either singly or collectively as the "position" of the object) can be desirable for a variety of purposes. A number of different position tracking systems exist. The operation of such position tracking systems is typically tailored in accordance with the characteristics of the particular application or applications for which the system is intended to be used, thus producing a position tracking system having particular characteristics.

Position tracking systems can be "tethered" or "untethered." In a tethered position tracking system, the object being tracked is either mounted on, attached to, or connected by another physical object (such as a wire) to a part of the tracking apparatus that is fixed with respect to the space ("tracking space") within which the position of the object is to be tracked. In an untethered position tracking system, there is no such physical mounting, attachment or connection. Typically, a tethered position tracking system restricts the movement of the tracked object with respect to the tracking space more than does an untethered system. Therefore, a tethered position tracking system may be undesirable or unusable for applications in which unfettered movement of the object is desired or necessary, such as applications in which the position of an object is to be tracked within a relatively large scale tracking space. Untethered position tracking systems, on the other hand, may not be as accurate as tethered position tracking systems, as a consequence of the less direct connection between the object being tracked and the tracking apparatus. Thus, untethered position tracking systems may be undesirable or unusable for applications in which a high degree of accuracy is required. Such applications tend to be, in general, applications in which the position of the object is to be tracked within a relatively small tracking space.

For example, the Global Positioning System (GPS), a satellite navigation system developed by the United States Department of Defense, is an untethered position tracking system used to track objects on a global (i.e., very large) scale. Multiple transmitters are positioned at fixed and known positions relative to the Earth. The transmitters emit signals that can be received by a receiver that is typically positioned on or near the surface of the Earth. The receiver receives signals from multiple transmitters. The duration of time required for each signal to travel from the corresponding transmitter to the receiver can be ascertained and used to determine the position of the receiver.

Because GPS transmitters must produce a signal that is strong enough to be detected globally, GPS transmitters require a relatively large amount of power. It is often not feasible, therefore, to implement a GPS transmitter having sufficient power that is small enough to be constructed as part of an object to be tracked. Consequently, as described above, a GPS tracking system is implemented so that the receiver, rather than the transmitter, is constructed as part of an object to be tracked. Further, the size of a physical device that embodies a receiver typically cannot be reduced beyond a certain point (i.e., there must be a minimum area devoted to receiving the incoming signal), even for very low power position tracking signals. Thus, a GPS tracking system is generally not well-suited to tracking the position of small objects.

Depending upon the characteristics of the hardware used in, and the geometry of, a particular implementation, a GPS tracking system can provide an estimate of the location of an object within approximately 20–30 meters in each direction. Thus, a GPS tracking system is useful in tracking an object within a relatively large scale tracking space (e.g., tracking the global position of an object), where such accuracy is acceptable.

A Polhemus tracking system is an example of a position tracking system that can be used for position-tracking in small tracking spaces. A Polhemus tracking system makes use of magnetic sensing to enable tracking. In a Polhemus tracking system, a magnetic field generator (transmitter) creates a magnetic field in the tracking space. A magnetic sensor (receiver) that is attached to an object being tracked includes a set of coils that are positioned at a known location and orientation with respect to the object. The magnetic field induces a current in the coils. The magnetic sensor is connected to a computer which can ascertain the magnitude and direction of the currents induced in the coils, and determine the location and orientation of the magnetic sensor (and, thus, the object) from those currents. The sensing electronics and the required computational capacity are each sufficiently complex that the magnetic sensor and computer can not typically be constructed together in an apparatus that is sufficiently small to be attached to the (typically small) object being tracked. Thus, Polhemus tracking systems are constructed as tethered systems in which the magnetic sensor is connected to the computer by a wire.

Similar to a GPS tracking system, the transmitter (magnetic field generator) of a Polhemus tracking system requires a relatively large amount of power, necessitating that the transmitter be embodied by a relatively large physical device. Since an object to be tracked is typically small, it is generally not feasible or desirable to implement a Polhemus tracking system so that a transmitter is attached to the object, rather than a receiver. Further, as indicated above, the size of a physical device that embodies a receiver typically cannot be reduced beyond a certain point. Thus, a Polhemus tracking system may not be capable of use in tracking the position of very small objects.

A Polhemus tracking system can enable accurate determination of the position of an object. However, since the object is tethered to the computer which performs the computations necessary to determine the position, a Polhemus tracking system can track the position of an object only within a relatively small tracking space. Further, since the objects are tethered, the number of objects that can feasibly be tracked is rather small, since, as the number of objects increases, the tethering wires become increasingly likely to become entangled.

Another example of a small scale position tracking system is a computer mouse that includes three receivers, fixed in position at known locations external to the mouse, that are adapted to receive ultrasound signals emitted by a transmitter that is attached to the mouse. The location of the transmitter (and, thus, the mouse) at the time a signal is emitted can be determined from the duration of time required for the signal to reach each receiver. The mouse is tethered to a computer to enable power to be supplied to the mouse, and to enable communication between the mouse and a computer with which the mouse is used.

This position tracking system also suffers from some limitations. The system is only adapted to track a single object. The system is also only adapted for use in tracking an object within a very small tracking space, e.g., a range of about a yard from the receivers. Finally, the object is tethered, thus limiting the range of motion of the object.

There are a variety of situations in which it is desirable to track the position of an object that is part of a computer interface. Such objects can be referred to as "active objects" and that term is sometimes used herein for that purpose. Further, herein, "computer interface" is used broadly to describe any point of interaction between a system including a computational device and a user of that system. For example, a glove worn by a user of a virtual reality system can be an active object. Or, a set of computer-controlled toy vehicles can be active objects. The chess pieces in a computerized chess game can be active objects.

The position tracking systems described above each have inadequacies when used to track one or more objects. The GPS tracking system is typically inappropriate for tracking active objects, since the scale of the tracking space is usually much smaller than the scale of a tracking space for which a GPS tracking system is appropriate. Further, the active objects themselves may be too small to enable an appropriate GPS receiver to be attached thereto. While a Polhemus tracking system is adapted to track objects in a tracking space having a scale that is more appropriate for tracking active objects, a Polhemus tracking system may also not be able to track very small active objects. Further, the tethering of a Polhemus tracking system may undesirably limit the range of motion of the active objects or the number of active objects that can be tracked, or otherwise undesirably interfere with the operation or use of the active objects. Finally, the computer mouse tracking system can track only a single active object. The size of the tracking space is also severely limited. Further, the tethering of the active object limits the range of motion of the object.

SUMMARY OF THE INVENTION

The invention can enable the position (i.e., location and/or orientation) of one or more untethered objects to be tracked. One or more transmitters, each of which has a fixed and known positional relationship to a corresponding object, each emit a sequence of position tracking signals. Each transmitter can emit a unique, identifiable position tracking signal so that the transmitter (and the object to which the transmitter is coupled) from which a signal was emitted can be identified. When a transmitter is coupled to each of multiple objects, the invention can enable the position of multiple objects to be tracked. When multiple transmitters are coupled to a single object, the invention enables both the location and the orientation of the object to be tracked. Multiple receivers receive the position tracking signals and record the times (time-stamp) at which the position tracking signals are received. (The receipt of a position tracking signal is termed a "detection event.") When multiple transmitters are being used, the receivers are adapted to enable identification of the transmitter from which a position tracking signal was emitted. The recorded times can be used to determine the location (and, in some cases, the orientation) of each object at a time that a position tracking signal was emitted from the corresponding transmitter. Depending upon the number and relative locations of the receivers used, the invention can be used to track the position of an object or objects in one, two or three dimensions.

The position tracking signals can be of any type that enables the transmitter and object to be untethered, such as acoustic (e.g., ultrasonic) or electromagnetic (e.g., microwave) signals. Since the objects are untethered, a system according to the invention can be used to track more objects, and track the objects as they move in a larger space, than is possible with the tethered tracking systems discussed above. The position tracking signals can advantageously be signals requiring a relatively small amount of power to generate (e.g., ultrasonic signals or radiofrequency signals), thus enabling the transmitter to be embodied in a physically small device, enabling the transmitter to be physically coupled to relatively small objects; in particular, small, low power transmitters can be used that enable tracking of objects that are smaller than those that can be tracked by the GPS or Polhemus tracking systems discussed above. Depending upon the transmitter signal power used, the invention can be used to track objects in small and medium-scale tracking spaces. In particular, the use of ultrasonic signals can be advantageous because ultrasonic signals are relatively computationally inexpensive to process.

In one embodiment of the invention, a system for tracking the position of an object includes a transmitter and at least four receivers. The transmitter is coupled to the object as described above. The receivers are positioned at fixed and known positions relative to a tracking space (which can itself be moving). As described above, the receivers can time-stamp detection events, which can then be used to determine the location of the transmitter (and, therefore, the object) at times that a signal was emitted by the transmitter. Preferably, the positions of the receivers are not coplanar, so that the system can track the location of the object in three dimensions. Additionally, preferably, the position tracking signals are ultrasonic, radiofrequency or other signals that require a relatively small amount of power to transmit, so that the transmitter can be embodied by a relatively small (e.g., 0.1 to 2 cubic inch) device. As can be appreciated, a system in accordance with this embodiment of the invention can advantageously enable the location of a small untethered object to be tracked in three dimensions. The system can be particularly useful for tracking the location of an object in a small or medium scale tracking space.

In another embodiment of the invention, a system for tracking the position of multiple objects includes multiple transmitters and multiple receivers. Each of the transmitters is coupled to a corresponding one of the objects as described above. As in the above embodiment, the receivers are positioned at fixed and known positions relative to a tracking space (which can itself be moving). The transmitters are implemented so that a position tracking signal emitted by a particular transmitter can be identified as having been emitted by that transmitter. As described above, the receivers can time-stamp detection events. The receivers can also identify the transmitter associated with a detection event (i.e., the transmitter that emitted a signal detected by the receiver). The time-stamped detection events associated with a particular transmitter can be used to determine the location of that transmitter (and, therefore, the object corresponding to that transmitter) at times that a signal was emitted by that transmitter. Depending upon the number and positioning of the receivers used, such a system can track the locations of the objects in one, two or three dimensions. As in the embodiment above, preferably, the position tracking signals are ultrasonic, radiofrequency or other signals that require a relatively small amount of power to transmit, so that the transmitter can be embodied by a relatively small device. A system in accordance with this embodiment of the invention can advantageously enable the location of multiple untethered objects to be tracked. In particular, the system can be useful for tracking the locations of small objects in a small or medium scale tracking space.

In yet another embodiment of the invention, a system for tracking the position of an object includes at least one pair of transmitters and multiple receivers. The pair of transmitters are coupled to the object as described above. As in the above embodiments, the receivers are positioned at fixed and known positions relative to a tracking space (which can itself be moving). The transmitters are implemented so that a position tracking signal emitted by a particular transmitter can be identified as having been emitted by that transmitter. Further, the transmitters can include synchronized clocks so that position tracking signals can be emitted from a pair of transmitters at the same time. (If the rotational rate of an object is limited to be, or is known to be, relatively small, position tracking signals need not be emitted at the same time from transmitters coupled to that object and, consequently, those transmitters need not include synchronized clocks.) As described above, the receivers can time-stamp detection events, as well as identify the transmitter associated with a detection event. The time-stamped detection events associated with a particular transmitter can be used to determine the location of that transmitter (and, therefore, the object corresponding to that transmitter) at times that a signal was emitted by that transmitter. Further, the locations at a particular time of a pair of transmitters coupled to an object can be used to determine the orientation of that object at that time. A system in accordance with this embodiment of the invention can advantageously be used to track both the location and the orientation of one or more untethered objects. Further, depending upon the number and positioning of the receivers used, such a system can track the location and orientation of the object(s) in one, two or three dimensions. As in the embodiments above, the position tracking signals can be signals that require a relatively small amount of power to transmit, thereby enabling use of a small transmitting device so that the location and orientation of one or more small objects can be tracked in a small or medium scale tracking space.

In still another embodiment of the invention, a system for tracking the position of an object includes an inertial device, a transmitter, multiple receivers and a controller. The transmitter is coupled to the object as described above. The inertial device is also coupled to the object. Again, as in the embodiments above, the receivers are positioned at fixed and known positions relative to a tracking space (which can itself be moving). The inertial device obtains inertial tracking information and represents a first position tracking subsystem. The inertial tracking information obtained by the inertial device can be communicated to the transmitter so that the information can be combined with the position tracking signal. As described above, the location of the transmitter (and, therefore, the object) at times that a signal was emitted by the transmitter can be determined by the controller from time-stamped detection events recorded by the receivers. Operating in this way, the transmitter and receiver represent a second position tracking subsystem. The inertial tracking information can be used to refine or augment the location information obtained by the transmitter/receiver position tracking subsystem. This can occur in one or both of two ways. First, the inertial device can typically obtain inertial tracking information more quickly than the transmitter/receiver position tracking subsystem can obtain location information, thereby enabling direct determination of the location of the object at times intermediate those at which the transmitter/receiver position tracking subsystem determines the location of the object. Second, the inertial device enables acceleration information to be determined, so that, even if the inertial tracking information is not obtained more quickly than the transmitter/receiver position tracking subsystem obtains location information, the acceleration information enables the location of the object at such intermediate times to be determined. Further, the location information determined by the transmitter/receiver position tracking subsystem is, over time, more reliable than location information determined by the inertial device, which tends to drift. Thus, the location information determined by the transmitter/receiver position tracking subsystem can be communicated by the controller to the inertial device to periodically recalibrate the inertial device, correcting any drift that may have occurred. As can be appreciated, a system according to this embodiment of the invention exploits the relative strengths of the two position tracking subsystems to result in an overall system that can track the location of an object more accurately than can either of the subsystems operating alone.

In another embodiment of the invention, a system for tracking the position of multiple objects includes multiple transmitters and multiple receivers. Each of the transmitters is coupled to a corresponding one of the objects as described above. Additionally, each of the receivers is coupled to a corresponding one of the objects so that a transmitter/receiver pair is coupled to each object. The transmitters are implemented so that a position tracking signal emitted by a particular transmitter can be identified as having been emitted by that transmitter. Further, the transmitters include synchronized clocks so that position tracking signals can be emitted from the transmitters at the same time. As described above, the receivers can time-stamp detection events, as well as identify the transmitter associated with a detection event. The time-stamped detection events from each receiver are communicated to one or more controllers, each of which can use the time-stamped detection events to determine the relative locations of the transmitters (and, therefore, the objects corresponding to the transmitters) at times that position tracking signals were emitted by the transmitters. In a further particular embodiment, a pair of transmitters are coupled to each object so that the orientation of the objects can also be determined. In another particular embodiment, an inertial device is coupled to each object so that inertial tracking information can be obtained for the object, thereby enabling improved location information to be obtained for the objects. A system in accordance with this embodiment of the invention can, like other embodiments above, advantageously enable the position of multiple untethered objects to be tracked. As in the embodiments above, the position tracking signals can advantageously be signals that require a relatively small amount of power to transmit, thereby enabling use of a small transmitting device so that the location and/or orientation of small objects can be tracked in a small or medium scale tracking space. As in some of the embodiments above, depending upon the number of receiver/transmitter pairs, a system according to this embodiment of the invention can track the locations of the objects in one, two or three dimensions.

The invention can be used for any application in which it is desired to track the position of one or more objects in a small or medium-scale space. For example, the invention can be used to track the location of mobile equipment in an industrial environment, such as a factory. Or, the invention can be used to track the location and orientation of each of a group of remotely operated cameras. The invention can also advantageously be used to track active objects (i.e., objects that are part of a computer interface).

DETAILED DESCRIPTION OF THE INVENTION

Figure 1:
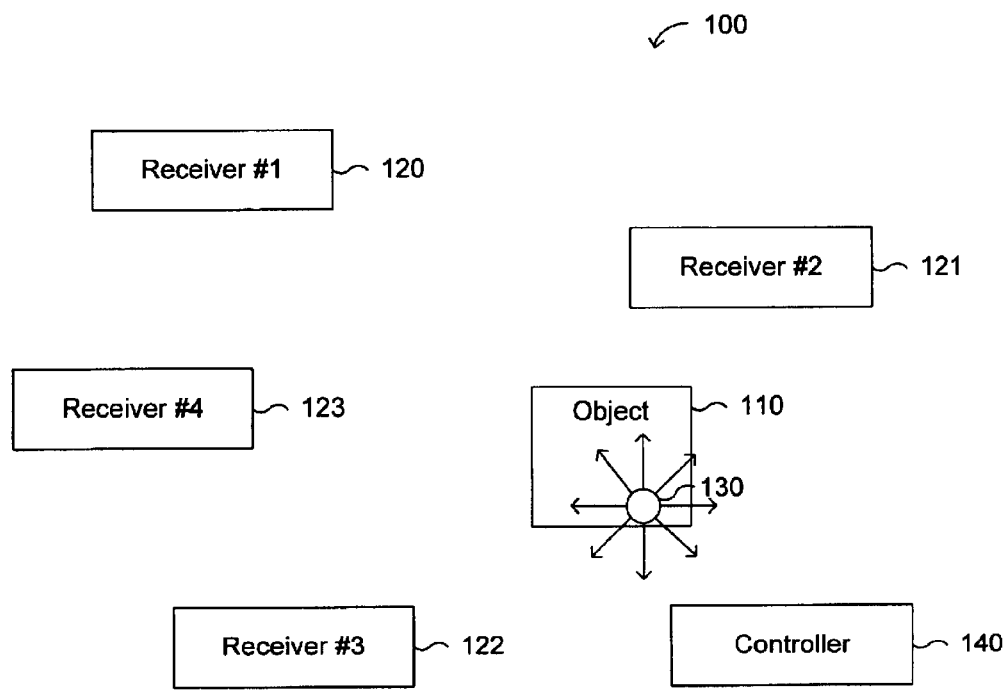
FIG. 1 is a diagram of a system, according to an embodiment of the invention, that enables tracking of the location of an object.

The invention can enable the position (i.e., location and/or orientation) of one or more untethered objects to be tracked. Herein, "untethered" means that an object is not mounted on, attached to, or connected by another physical object (other than air or other ambient fluid, such as water, in which the object is partly or totally immersed) to a part of a tracking apparatus that is fixed with respect to the space ("tracking space") within which the position of the object is to be tracked. In an untethered position tracking system, there is no such physical mounting, attachment or connection. The invention can, for example, advantageously be used to track active objects (i.e., objects that are part of a computer interface).

One or more transmitters, each of which has a fixed and known positional relationship to a corresponding object, each emit a sequence of signals. (These signals are sometimes referred to herein as "position tracking signals.") Multiple receivers receive the position tracking signals emitted by each transmitter. Each of the receivers includes a clock (which is synchronized in time with respect to the clock of each other receiver), so that the receiver can record the time at which each signal is received by the receiver. These recorded times can be communicated by the receivers to a controller, which can determine from the recorded times the location (and, in some cases, the orientation, as explained below) of each object at a time that a position tracking signal was emitted from the corresponding transmitter. In particular, each transmitter can emit a unique, identifiable signal that enables identification of the transmitter (and the object to which the transmitter is coupled) from which a signal was emitted, thereby enabling the position of multiple objects to be tracked when a transmitter is coupled to each of multiple objects and/or the orientation of an object to be tracked when multiple transmitters are coupled to a single object.

The signals emitted by a transmitter of a system according to the invention can be of any type that enables the transmitter and object to be untethered, such as acoustic (e.g., ultrasonic) or electromagnetic (e.g., microwave) signals. Since the objects are untethered, a system according to the invention can be used to track more objects, and track the objects as they move in a larger space, than is possible with the tethered tracking systems discussed above.

The transmitter(s) of a system according to the invention can advantageously be adapted to emit position tracking signals that require a relatively small amount of power to generate (e.g., ultrasonic signals or radiofrequency signals), thus enabling the transmitter(s) to be embodied in physically small device(s), enabling the transmitter(s) to be physically coupled to relatively small objects. This may be necessary or desirable in some applications for which a system according to the invention can be used (e.g., some systems of active objects). Moreover, since small, lower power transmitters can be used, the invention can be used to track objects that are smaller than those that can be tracked by the GPS or Polhemus tracking systems discussed above. In particular, the use of ultrasonic signals can be advantageous because ultrasonic signals are relatively computationally inexpensive to process.

Depending upon the transmitter signal power used, the invention can be used to track objects in small and medium-scale tracking spaces (e.g., spaces defined by locations that are up to approximately 100 yards or less from a receiver of the system). Further, depending upon the number and relative locations of the receivers used, the invention can be used to track the position of an object or objects in one, two or three dimensions.

The invention can be used for any application in which it is desired to track the position of one or more objects in a small or medium-scale space. For example, the invention could be used to track the location of mobile equipment in an industrial environment, such as a factory. Or, the invention could be used to track the location and orientation of each of a group of remotely operated cameras.

FIG. 1 is a diagram of a system 100, according to an embodiment of the invention, that enables tracking of the location of an object. In FIG. 1, the system 100 tracks the location of an object 110.

The system 100 includes a transmitter 130 that is adapted to emit a sequence of position tracking signals. As discussed further below, the transmitter 130 is coupled to the object 110 so that the transmitter 130 maintains a fixed and known positional relationship to the object 110.

The system 100 also includes four receivers 120, 121, 122 and 123 that are positioned at fixed and known positions with respect to a defined space ("tracking space") within which the location of the object 110 is to be tracked. If the locations of the four receivers 120, 121, 122 and 123 are not coplanar, then the system 100 can track the location of the object 110 in three dimensions. If the locations of the four receivers 120, 121, 122 and 123 are coplanar, collinear or coincident, then the system 100 can only track the location of the object 110 in, respectively, two dimensions, one dimension or not at all. (This aspect of the relative positions of the receivers 120, 121, 122, and 123 is also characteristic of the embodiments of the invention described below.)

When the transmitter 130 emits a position tracking signal, the signal is received by each of the four receivers 120, 121, 122 and 123. (Herein, reception of a position tracking signal by a receiver is sometimes referred to as a "detection event.") Each of the four receivers 120, 121, 122 and 123 includes a clock that enables the time of a detection event to be ascertained, as well as a memory device that enables the time to be recorded. (Herein, such a time is sometimes referred to as a "time tag.") The clocks of the receivers 120, 121, 122 and 123 are synchronized so that the time tags recorded by different ones of the receivers 120, 121, 122 and 123 can be meaningfully related to each other, as described below.

The system 100 also includes a controller 140. As described further below, the controller 140 and the receivers 120, 121, 122 and 123 are adapted to enable communication therebetween. The receivers 120, 121, 122 and 123 communicate the time tags to the controller 140. As explained further below, the controller uses the time tags, together with the speed of the position tracking signals and the known positions of the receivers 120, 121, 122 and 123, to determine the location of the transmitter 130 (and, therefore, the object 110, which bears a fixed positional relationship thereto) at a time that a position tracking signal was emitted from the transmitter 130.

In the system 100 (as well as in systems according to other embodiments of the invention, as, for example, described below), it must be possible to associate each detection event identified by a receiver 120, 121, 122 or 123 with a particular position tracking signal, so that the controller 140 can use a proper set of detection events to determine the location of the object 110 at the time that the particular position tracking signal was emitted. This can be accomplished by making the duration of the time period between the beginning of successive position tracking signals longer than the maximum delay time between a pair of the receivers 120, 121, 122 and 123, so that sets of four temporally successive time-tagged detection events can be identified as corresponding to the same position tracking signal. (The delay time between a pair of receivers is the duration of time between detection events at the pair of receivers for the same position tracking signal.) Preferably, the interval between the beginning of position tracking signals is made sufficiently longer than the maximum receiver delay time (e.g., at least twice as long) so that groups of detection events can be unequivocally identified as corresponding to a particular position tracking signal.

Figure 2:
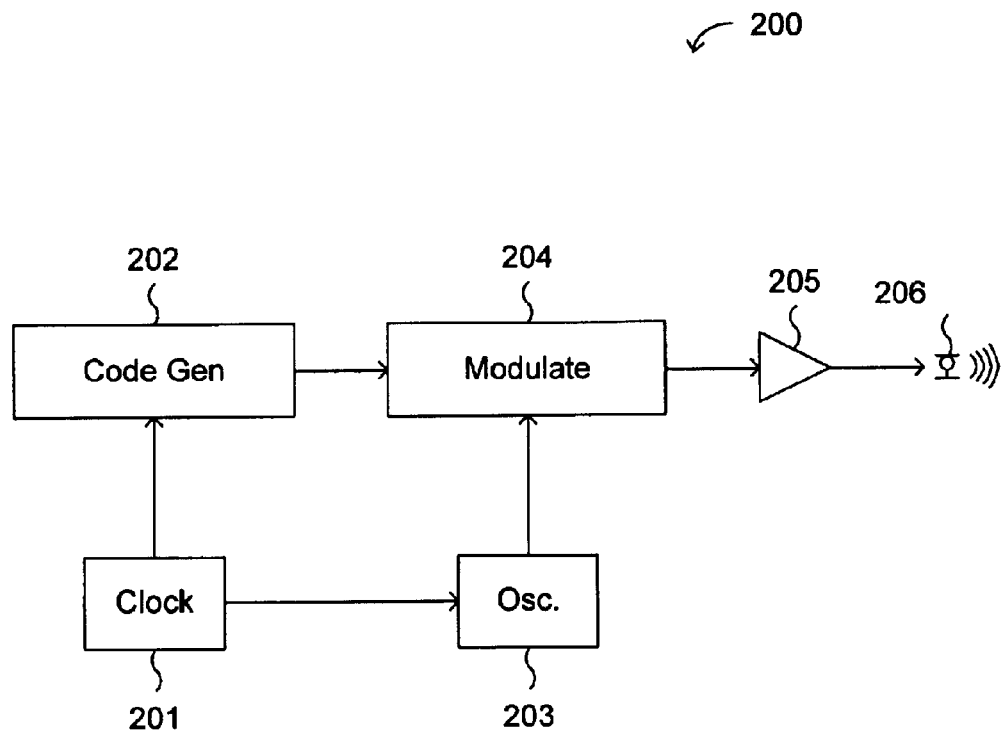
FIG. 2 is a block diagram of one embodiment of a transmitter that can be used with a system according to the invention.

A transmitter for use with a system according to the invention must emit a signal that can be identified by the receivers of the system as a signal emitted by such a transmitter. Additionally, it may be desirable that the signal have a desired frequency bandwidth. Such a signal can be embodied as a series of modulated pulses produced by using a baseband signal to modulate a carrier signal. FIG. 2 is a block diagram of a transmitter 200, capable of use with a system according to the invention, that produces a series of modulated pulses.

It is desirable that the signal emitted by the transmitter require low power for generation, so that a power supply (e.g., battery) used with the transmitter can be made small and can last a long time before needing to be replaced. It may also be desirable for the transmitter signal to have a frequency bandwidth including only frequencies above the range of sound audible to humans and animals. Further, it is desirable for the transmitter signal to be relatively computationally inexpensive to process. An ultrasonic signal satisfies each of these criteria and can advantageously be used as the transmitter signal in systems according to the invention. The transmitter 200 is sometimes described below as used to emit an ultrasonic signal.

As shown in FIG. 2, the transmitter 200 includes a clock 201, a code generator 202, an oscillator 203, a modulator 204, an amplifier 205 and an emitting transducer 206. Each of the clock 201, code generator 202, oscillator 203, modulator 204, amplifier 205 and emitting transducer 206 can be embodied by conventional physical devices and/or software (e.g., the code generator 202, oscillator 203 and/or modulator 204 can be embodied by a microprocessor operating in accordance with software that produces appropriate functionality) adapted to perform the functions described herein, as can be appreciated by those skilled in the art of data communications. The transmitter 200 also includes (or can include) other components not illustrated in FIG. 2, such as a power supply (e.g., battery, data storage device(s)). Those components are not illustrated in FIG. 2 to simplify the illustration of the transmitter 200 and enhance the clarity of the explanation of the transmitter 200. The presence, construction and operation of such components, as well as their interaction with the components of the transmitter 200 illustrated in FIG. 2, is understood by those skilled in the art of making and using transmitting devices.

The transmitter 200 produces and emits a position tracking signal as follows. The code generator 202 generates a baseband signal using a code word that identifies the transmitter 200. (Herein, "code word" is used interchangeably to refer to both the symbol or symbols that represent the code word and the baseband signal generated using the symbol or symbols.) The code word is input to the modulator 204, together with a carrier signal that is generated by the oscillator 203. The clock 201 is used to coordinate the timing of the input of the code word and the carrier signal to the modulator 204. The modulator 204 uses the code word to modulate the signal from the oscillator 203. The modulated signal output from the modulator 204 is input to the amplifier 205, which, in turn, outputs an amplified signal to the emitting transducer 206 that emits the signal (position tracking signal) from the transmitter 200.

During operation of a system according to the invention, a transmitter such as the transmitter 200 produces a sequence of position tracking signals. The beginning of successive position tracking signals is separated by a period of time, $T_{period}$, subject to the constraint discussed above. The duration of a position tracking signal is a function of the length of a code word (discussed in more detail below) and, when the code word is a binary sequence, the bit rate (also discussed in more detail below) at which the code word is processed to produce a position tracking signal. The time period, $T_{period}$, is typically sufficiently long that successive position tracking signals are separated by an interval of time. The duration of the position tracking signal divided by the time period, $T_{period}$, is the duty cycle of the position tracking signals. The magnitude of the duty cycle can affect operation of a system according to the invention, as discussed below.

In general, a code word as used in the invention can be any set of one or more symbols (e.g., numeric characters) that can be used to identify a transmitter. For example, the code word can be a binary sequence of a specified length. Preferably, the code word generated by the code generator 202 should appear to be random. This is desirable to facilitate the performance of the matched filter. When the code word is a binary sequence, selection of a random code word can be accomplished by choosing a binary sequence that has good auto-correlation. (As known by those skilled in the art, auto-correlation, which is determined by convolving a sequence with itself, is capable of use as a statistical indicator of the randomness of a sequence). When a system according to the invention includes only a single transmitter, the selection of a binary sequence to be the code word can be accomplished using known mathematical theorems that can determine, for a binary sequence of a specified length, the sequence that has the best auto-correlation. Typically, a code word for a transmitter is selected and stored in a data storage device of the transmitter as part of production of a system according to the invention.

The operation of a system according to the invention is affected by the frequency bandwidth (sometimes referred to herein simply as "bandwidth") of the position tracking signals emitted by a transmitter of the system. For example, as is well understood by those skilled in such art, in a non-coherent transmitter/receiver system, the uncertainty, d, in the measurement of the distance of a transmitter from a receiver is inversely related to the bandwidth, B, of the position tracking signals ($d$~$1/B$) emitted by the transmitter. Illustratively, if the velocity of sound is approximately 333 m/sec., a bandwidth of 20 kHz results in a location uncertainty of approximately 17 mm. This relationship between the bandwidth and the location uncertainty makes it desirable (setting aside other considerations) to make the bandwidth of the position tracking signals as large as possible. However, the magnitude of the bandwidth cannot be larger than twice the frequency of the carrier signal generated by the oscillator 203.

Further, the magnitude of the minimum and maximum frequencies within the frequency bandwidth may preferably have particular values. For example, it is desirable that the minimum frequency be greater than that audible to humans. With this criterion in mind, the magnitude of the minimum frequency within the bandwidth of the position tracking signals is preferably approximately 24 kHz. It may also be desirable that the minimum frequency be greater than that audible to most domestic animals. With this criterion in mind, the magnitude of the minimum frequency within the bandwidth of the position tracking signals is preferably approximately 40 kHz. Additionally, as the frequency of an ultrasonic signal increases, the signal becomes more susceptible to energy absorption by the medium (e.g., air) through which the signal travels. As the distance the signal must travel between the transmitter and a receiver decreases, this absorption becomes relatively less important. For embodiments of the invention in which the expected distance between transmitter(s) and receivers is typically about 1 meter, the magnitude of the maximum frequency within the bandwidth of the position tracking signals is preferably approximately 250 kHz. For embodiments of the invention in which the expected distance between transmitter(s) and receivers is typically about 5 meters, the magnitude of the maximum frequency within the bandwidth of the position tracking signals is preferably approximately 40–60 kHz. For embodiments of the invention in which the expected distance between transmitter(s) and receivers is typically about 20 meters, the magnitude of the maximum frequency within the bandwidth of the position tracking signals is preferably approximately 40 kHz.

Additionally, it can be desirable to establish the carrier signal frequency and the magnitude of the bandwidth of the position tracking signals such that the former is an integral multiple of one half of the latter. This is desirable because it enables the modulator 204 to be modeled by relatively simple switching logic that can be implemented using a relatively simple integrated circuit. The carrier signal frequency need not necessarily be an integral multiple of one half of the magnitude of the bandwidth; in that case, however, the modulator 204 must be implemented using somewhat more complex circuitry.

The frequency bandwidth of the position tracking signal emitted by the transmitter 200 can be controlled by appropriately controlling the code generator 202 and oscillator 203. For certain modulation schemes (e.g., on/off keying, binary phase shift keying), the magnitude of the bandwidth is equal to twice the frequency of the signal generated by the code generator 202, i.e., when the code word is a binary sequence, twice the bit rate at which the bits of the binary sequence are used to produce the baseband signal. The center frequency of the bandwidth is equal to the frequency of the carrier signal generated by the oscillator 203. Thus, by causing the code generator 202 and oscillator 203 to generate signals of appropriate frequency, a desired frequency bandwidth of the position tracking signal can be established. Illustratively, the oscillator 203 can generate a carrier signal having a frequency of 48 kHz and the code generator 202 can generate a baseband signal using a binary sequence that is processed at a bit rate of 16 kbits/sec., thus producing a position tracking signal having a frequency bandwidth ranging from 32 kHz to 64 kHz.

In general, the modulator 204 can be adapted to implement any appropriate type of modulation, such as on-off keying, phase shift keying (PSK) or frequency shift keying (FSK). The use of binary phase shift keying (BPSK) modulation can advantageously reduce Doppler sensitivity. The implementation and operation of a modulator that uses a code word, as described herein, to modulate a carrier signal in accordance with an appropriate type of modulation, as discussed above, is understood by those skilled in that art. In essence, the modulator 204 multiplies the frequency spectrum of the code word by the carrier signal to produce a signal having a frequency spectrum centered about the carrier signal frequency, i.e., the code word frequency spectrum is mapped to a new spectrum centered about the carrier signal frequency. If on-off keying or PSK are used, then the frequency spectrum of the position tracking signal can be controlled as described above. If FSK is used, the position tracking signal includes multiple frequency bandwidths, each centered about one of the carrier signal frequencies and having a magnitude equal to twice the frequency (e.g., bit rate) of the baseband signal.

Generally, the amplifier 205 can be embodied by any appropriate conventional amplifier. As indicated above, it is desirable that the position tracking signal produced by the transmitter 200 require low power for generation. Switched-mode amplifiers are more efficient than linear amplifiers and, in view of the desirability of low power consumption by the transmitter 200, can advantageously be used to embody the amplifier 205. However, a switched-mode amplifier can introduce undesirable non-linearities into the position tracking signal produced by the transmitter 200. The detrimental effect of such non-linearities can be reduced by limiting the frequency bandwidth of the position tracking signal to less than an octave, such control of the frequency bandwidth being effected as described above.

Additionally, the power consumption of the transmitter 200 can be reduced by reducing the number of position tracking signals emitted by the transmitter 200. For example, the transmitter 200 can be controlled to emit position tracking signals only as frequently as necessary to satisfy the required position update rate for the application for which the system according to the invention is being used. The transmitter 200 can also be controlled to stop emitting position tracking signals whenever the transmitter 200 has been stationary for a predetermined length of time, the emission of position tracking signals beginning again when the transmitter 200 moves again. Such monitoring of movement by the transmitter 200 can be accomplished by including a conventional mercury switch as part of the transmitter 200, the mercury switch sensing motion of the transmitter 200, and the clock 201 (together with a processing device, not shown in FIG. 2, that is part of the transmitter 200) monitoring the passage of time.

Figure 3:
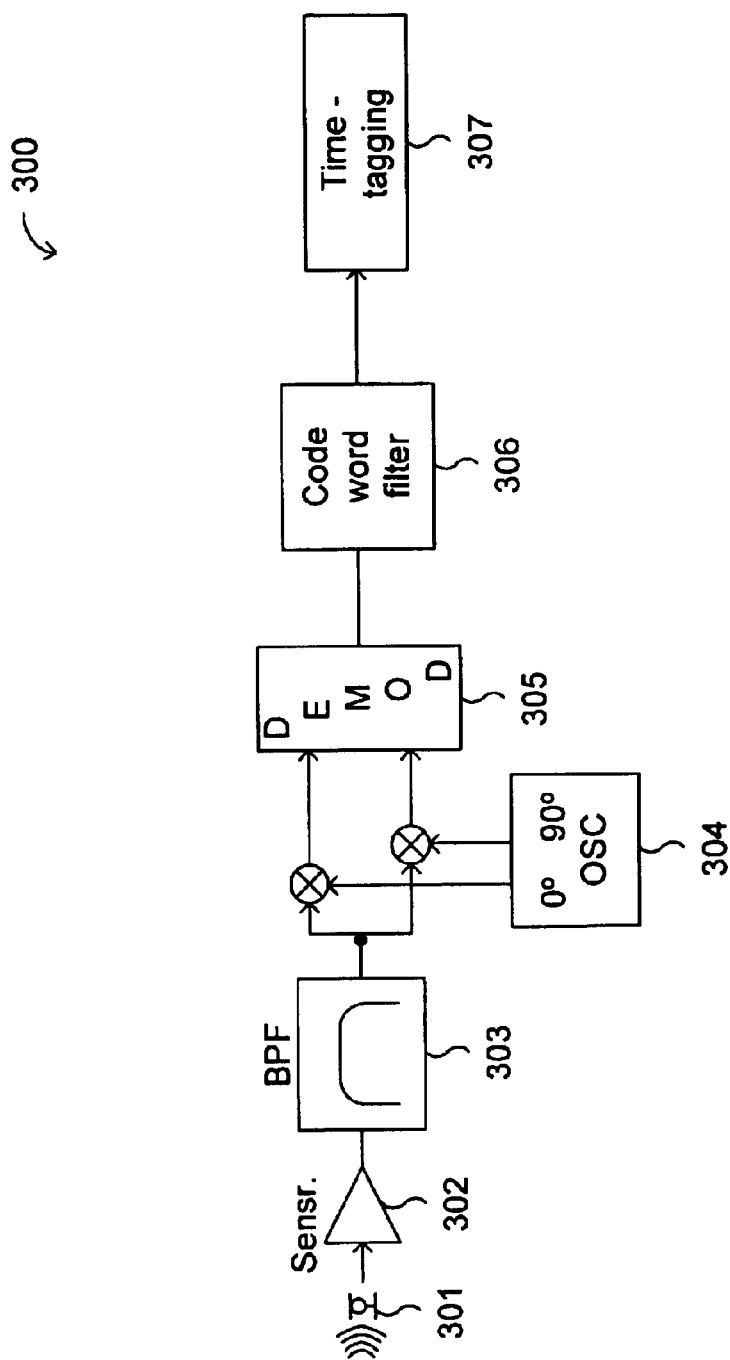
FIG. 3 is a block diagram of one embodiment of a receiver that can be used with a system according to the invention.

FIG. 3 is a block diagram of a receiver 300 that can be used with a system according to the invention. The receiver 300 can process a received signal to identify the source of the signal (i.e., a transmitter of a system according to the invention).

As shown in FIG. 3, the receiver 300 includes a receiving transducer (microphone) 301, a sensing amplifier 302, a band pass filter 303, an oscillator 304, a demodulator 305, a code word filter 306 and a time tagging mechanism 307. Each of the receiving transducer 301, sensing amplifier 302, band pass filter 303, oscillator 304, demodulator 305, the code word filter 306 and the time tagging mechanism 307 can be embodied by conventional physical devices and/or software adapted to perform the functions described herein, as can be appreciated by those skilled in the art of data communications. The receiver 300 also includes (or can include) other components not illustrated in FIG. 3, such as a power supply (e.g., battery) and a processing device. Those components are not illustrated in FIG. 3 to simplify the illustration of the receiver 300 and enhance the clarity of the explanation of the receiver 300. The presence, construction and operation of such components, as well as their interaction with the components of the receiver 300 illustrated in FIG. 3, is understood by those skilled in the art of making and using receiving devices.

The receiver 300 receives a signal as follows. A signal is detected by the receiving transducer 301 and input to the sensing amplifier 302. The sensing amplifier 302 outputs an amplified signal to the band pass filter 303, which filters out components of the received signal having a frequency that is not within the expected bandwidth of frequencies established for position tracking signals of the system with which the receiver 300 is used. The demodulator 305, operating together with the oscillator 304, processes received signals to extract a baseband signal. The extracted baseband signal is then input to the code word filter 306 to determine whether the baseband signal corresponds to a code word of a transmitter that is part of a system according to the invention of which the receiver 300 is also part. When a code word is identified by the code word filter 306, the time tagging mechanism 307 is used to associate with the code word the time that the signal containing the code word was received by the receiver 300.

As indicated above, it is desirable that the position tracking signal produced by a transmitter of a system according to the invention require low power for generation. By implementing the receivers of a system according to the invention so as to increase the amount of energy that they absorb, lower power position tracking signals can be emitted by the transmitter, thereby decreasing the transmitter power requirements. Thus, the receiving transducer 301 of the transmitter 300 is desirably implemented so that as much surface area as possible is available for reception of signals by the receiving transducer 301.

The demodulator 305 is implemented, as known by those skilled in that art, so as to demodulate a received signal, in accordance with the type of modulation performed by the modulator of a transmitter that is used in the system of which the receiver 300 is part, to produce a baseband signal. In essence, the demodulator 305 multiplies the frequency spectrum of the received signal by the carrier signal to produce a signal having two frequency spectra, one centered about a frequency that is twice the carrier signal frequency and one that is centered about DC (and which may represent a code word), i.e., the received signal frequency spectrum is mapped back to the code word frequency spectrum.

When asynchronous demodulation is used, the received signal must be in phase with the position tracking signal as emitted by the transmitter in order for the demodulator 305 to be able to extract a baseband signal representing a code word from the received signal. It is not possible to know, without special processing, whether a phase shift has occurred in a position tracking signal received by the receiver 300. The oscillator 304, together with the demodulator 305, can enable detection of any phase shift that exists between a frequency component of the position tracking signal as emitted by a transmitter and the corresponding frequency component of the position tracking signal as received by the receiver 300. The oscillator 304 provides the carrier signal (i.e., the same signal as the carrier signal produced by a transmitter of the system of which the receiver 300 is part) and a signal that is 90 degrees out of phase with respect to the carrier signal for separate use by the demodulator 305 in demodulating the received signal. The product of one of these demodulations will include a frequency spectrum centered about DC, i.e., a baseband signal.

The baseband signal can be culled from the demodulated signals in one of two ways. A low pass filter can be applied to each of the demodulated signals, nothing passing through the low pass filter applied to one of the demodulated signals and only the baseband signal passing through the low pass filter applied to the other demodulated signal. Alternatively, each of the demodulated signals can be multiplied by itself, the products added together, and a low pass filter applied to the sum, only the baseband signal being able to pass through the low pass filter. Which of these two approaches is used can depend on the modulation scheme used.

Once the received signal has been demodulated to produce a baseband signal, the baseband signal is input to the code word filter 306. When a code word is represented as a binary sequence, as discussed above, the code word filter 306 can operate by convolving the code word for a transmitter of the system with the binary sequence represented by the demodulated baseband signal. If the code word is present in the baseband signal, the product of the convolution will be the auto-correlation sequence for that code word, as discussed above. If only noise is present in the baseband signal, the product of the convolution will show low correlation between the code word of the filter and the baseband signal.

As indicated above, when receipt of a code word is detected, the time tagging mechanism 307 is used to associate with such receipt a time that the signal containing the code word was received by the receiver 300. The tagged time can be, for example, the time that the signal is received by the receiver 300. or the time at which the signal reaches the time tagging mechanism 307. The time tagging mechanism 307 can be implemented using conventional apparatus (e.g., clock), as known to those skilled in the art.

To fully utilize the resolution of the code word filter 306, the clock of the time tagging mechanism 307 requires a resolution of one half the frequency of the baseband signal generated by the code generator 202 of the transmitter 200 (i.e., when the code word is a binary sequence, twice the bit rate at which the bits of the binary sequence are used to produce the baseband signal). The total period of the clock should be at least twice the time period between the beginning of successive position tracking signals, so that time tags from successive position tracking signals can be easily discriminated. In view of the foregoing constraints, the number of bits in a time tag clock value is given by equation (1):

$$\begin{aligned} N_{cb} &= \text{ceiling } [\log_2\{T_{clock,tot}/T_{clock,res}\}] \\ &= \text{ceiling } [\log_2\{(2*T_{period})/(T_{bit}/2)\}] \\ &= \text{ceiling } [\log_2\{4*T_{period}/T_{bit}\}] \\ &= \text{ceiling } [\log_2\{(T_{period}/T_{bit})+2\}] \end{aligned} \tag{1}$$

where $N_{cb}$=number of bits in a time tag clock value $T_{clock,tot}$=total period of the clock $T_{clock,res}$=resolution of the clock $T_{period}$=time period between beginning of successive position tracking signals, and $T_{bit}$=duration of a bit of a code word binary sequence Though not shown in FIG. 3, the receiver 300 also includes a mechanism for transmitting data representing the time tagged detection events to a controller. Such mechanism can be embodied in any appropriate manner. The receiver 300 can be tethered to the controller (e.g., the receiver 300 communicates with the controller via a wire connection to the controller) or untethered (i.e., the receiver 300 communicates with the controller via a wireless connection to the controller). However the receiver 300 communicates with the controller, the receiver 300 includes an appropriate communications interface, as known to those skilled in such art, to enable data to be output from the receiver 300 to the communications medium.

A controller (e.g., the controller 140 in FIG. 1) for use in a system according to the invention can be implemented by any appropriate computational device, such as a conventional digital computer, that can perform the functions of a controller as described herein. For example, in systems according to the invention that are embodied in apparatus that is relatively small, the controller 140 may be implemented by a microcontroller. For larger scale systems, the controller may be implemented by a desktop or portable (e.g., notebook) computer. Computers and microcontrollers that can be used with the invention are known by those skilled in such art, particularly in view of the description herein, and are widely available.

The controller 140 must include an interface that enables receipt of data from the receivers 120, 121, 122 and 123. The communications.bandwidth of this interface must be adequate to receive, during a time interval equal to the time interval between emission of position tracking signals from a transmitter, data from each receiver regarding the detection event recorded by that receiver. The magnitude of such communications bandwidth is discussed in more detail below with respect to embodiments of the invention that include multiple transmitters.

As indicated above, the time tagged detection events communicated to a controller from the receivers are used to determine the location of a transmitter. In particular, the differences in the duration of time that a position tracking signal took to travel from a transmitter to the receivers can be determined from the time tags corresponding to that signal that are recorded by the receivers. Using these differences in time duration, and knowledge of both the speed of the position tracking signals (e.g., the speed of sound when ultrasonic signals are used) and the position of the receivers, a set of hyperbolic equations can be used to determine the location of, and time of transmission from, the transmitter. More accurately, given the uncertainty, d, in the measurement of the distance of a transmitter from a receiver (or, correspondingly, in the measurement of the differences, as between receivers, in distance between a receiver and the transmitter), the hyperbolic equations can be used to determine, with the above-described known information, an ellipsoidal volume within which the transmitter must be located. The probability of the transmitter being located at any particular location within the ellipsoidal volume is given by a probability distribution within the ellipsoidal volume that is determined from the hyperbolic equations.

The system 100 (FIG. 1) described above includes a single transmitter. Such a system tracks only a single object and only the location of that object. As described below with respect to, for example, FIGS. 4, 5 and 6, systems according to the invention can include multiple transmitters, thereby enabling position tracking information in addition to location to be obtained for a single object and/or position tracking information to be obtained for multiple objects. However, in such systems, the transmitters and receivers must be adapted to enable the receivers to distinguish position tracking signals from different transmitters. A mechanism for enabling such discrimination is described below following a general description of some systems according to the invention including multiple transmitters.

Figure 4:
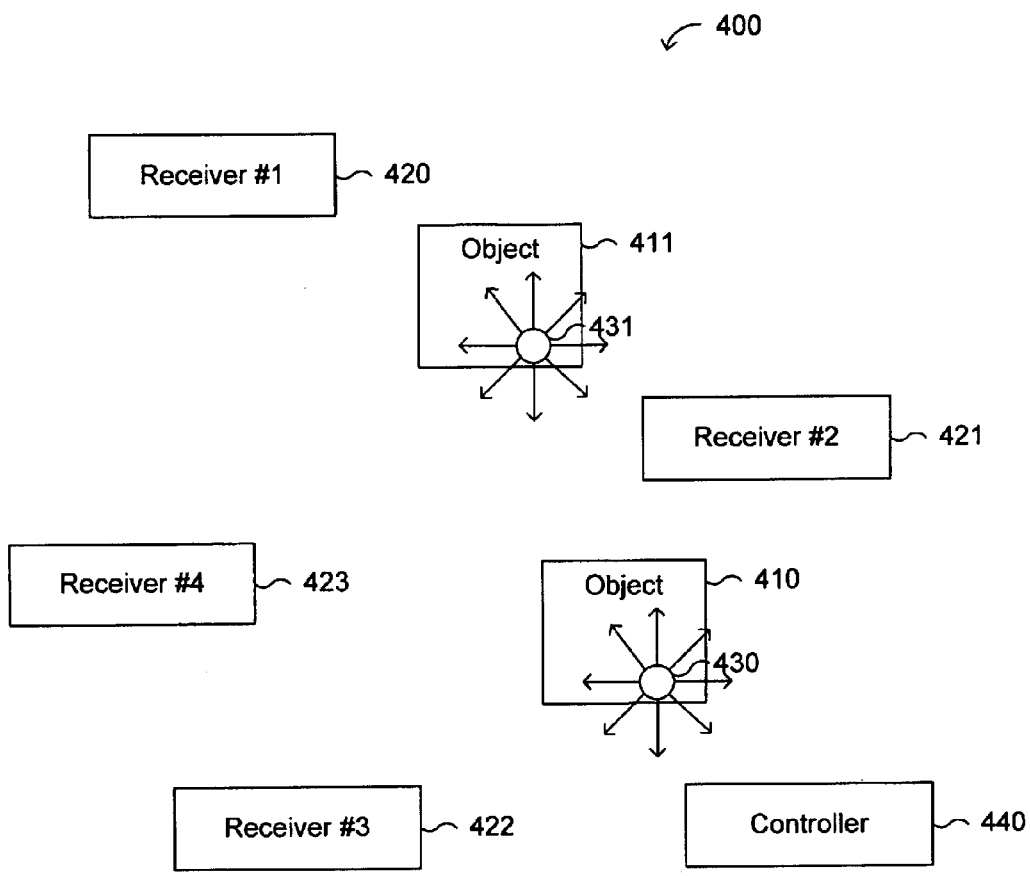
FIG. 4 is a diagram of a system, according to another embodiment of the invention, that enables tracking of the locations of multiple objects.

FIG. 4 is a diagram of a system 400, according to another embodiment of the invention, that enables tracking of the locations of multiple objects. As will be appreciated, many aspects of the operation of the system 400 are the same as, or similar to, aspects of the operation of the system 100. (FIG. 1) described above. In FIG. 4, the system 400 tracks the locations of two objects: objects 410 and 411. However, generally, the system 400 can be used to track the locations of any number of objects.

The system 400 includes four receivers 420, 421, 422 and 423, two transmitters 430 and 431, and a controller 440. The receivers 420, 421, 422 and 423 can be positioned at fixed and known positions with respect to a tracking space, as described above. In a manner similar to that described above, the transmitters 430 and 431 are each coupled to a corresponding one of the objects—objects 410 and 411, respectively—so that the transmitter 430 or 431 maintains a fixed and known positional relationship to the corresponding object 410 or 411.

The transmitters 430 and 431 are each adapted to emit a sequence of position tracking signals, as described above. When either the transmitter 430 or the transmitter 431 emits a position tracking signal, the signal is received by each of the four receivers 420, 421, 422 and 423. As described above, the receivers 420, 421, 422 and 423 include synchronized clocks that enable ascertainment of the times at which such detection events occur, as well as memory devices that enable such time tags to be recorded. As described in more detail below, the transmitters 430 and 431, and the receivers 420, 421, 422 and 423 are implemented in a manner that enables the receivers 420, 421, 422 and 423 to ascertain from which transmitter 430 or 431 a received position tracking signal was transmitted. As described above, the controller 440 is adapted to determine, for each position tracking signal emitted by one of the transmitters 430 or 431, the location of the transmitter 430 or 431 (and, therefore, the corresponding object 410 or 411) at the time that the signal was emitted from the transmitter 430 or 431. Since the position tracking signals emitted by the transmitters 430 and 431 can be distinguished from each other, the locations of both objects 410 and 411 can be tracked.

Figure 5:
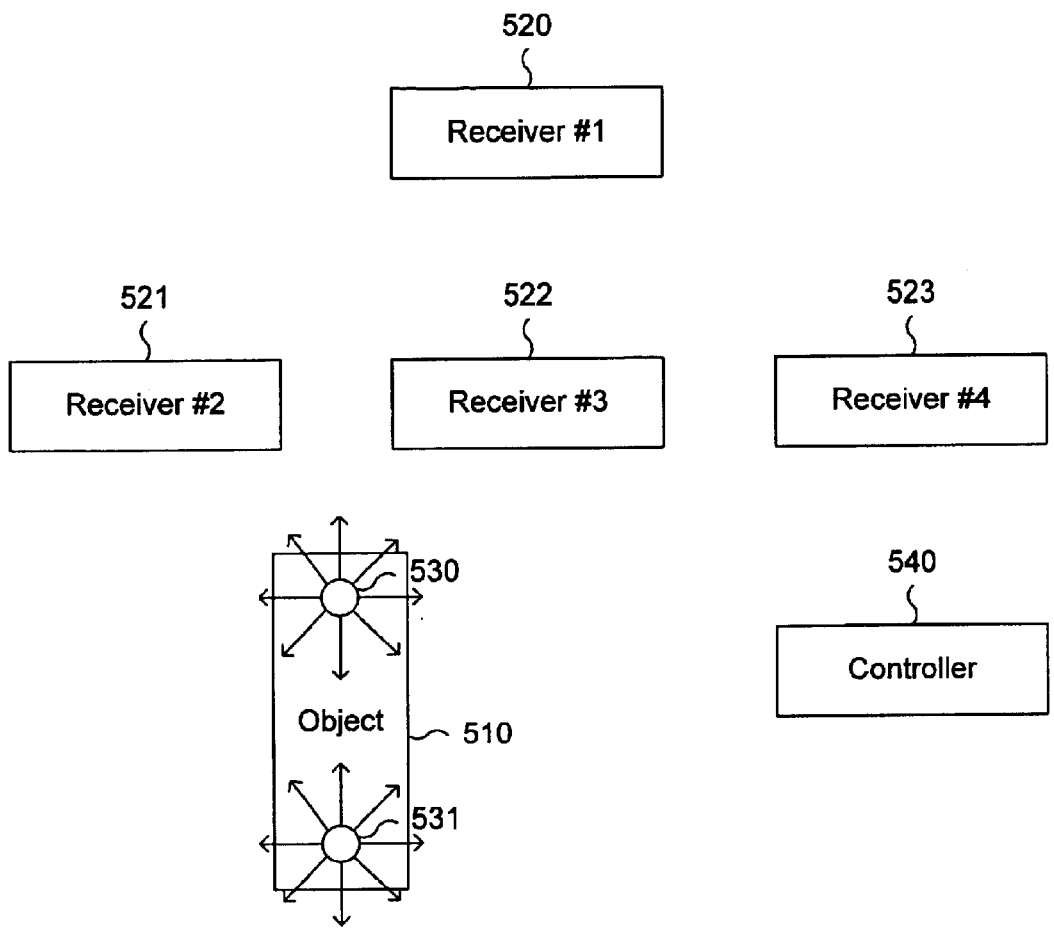
FIG. 5 is a diagram of a system, according to yet another embodiment of the invention, that enables tracking of the location and orientation of an object.

FIG. 5 is a diagram of a system 500 according to yet another embodiment of the invention. Like the system 100 (FIG. 1), the system 500 enables tracking of the location of a single object. However, the system 500 also enables tracking of the orientation of that object. In FIG. 5, the system 500 tracks the location and orientation of an object 510. As will be appreciated, many aspects of the operation of the system 500 are the same as, or similar to, aspects of the operation of the systems 100 (FIG. 1) and 400 (FIG. 4) described above.

The system 500 includes four receivers 520, 521, 522 and 523, two transmitters 530 and 531, and a controller 540. The receivers 520, 521, 522 and 523 can be positioned at fixed and known positions with respect to a tracking space, as described above. In a manner similar to that described above, the transmitters 530 and 531 are each coupled to the object 510 so that the transmitters 530 and 531 each maintain a fixed and known positional relationship to the object 510.

The transmitters 530 and 531 are each adapted to emit a sequence of position tracking signals, as described above. When either the transmitter 530 or the transmitter 531 emits a position tracking signal, the signal is received by each of the four receivers 520, 521, 522 and 523. As described above, the receivers 520, 521, 522 and 523 include synchronized clocks that enable ascertainment of the times at which such detection events occur, as well as memory devices that enable such time tags to be recorded. As mentioned above and described below, the transmitters 530 and 531, and the receivers 520, 521, 522 and 523 are implemented in a manner that enables the receivers 520, 521, 522 and 523 to ascertain from which transmitter 530 or 531 a received position tracking signal was transmitted. As further described above, the controller 540 is adapted to determine, for each position tracking signal emitted by one of the transmitters 530 or 531, the location of the transmitter 530 or 531 (and, therefore, the object 510) at the time that the signal was emitted from the transmitter 530 or 531.

The transmitters 530 and 531 can be controlled to emit position tracking signals at the same time. The transmitters 530 and 531 can include synchronized clocks that enable this to be accomplished (however, synchronized clocks may not be needed if the rotational rate is sufficiently low, as described above. Since the position tracking signals emitted by the transmitters 530 and 531 can be distinguished from each other, the locations of both transmitters 530 and 531 can be determined at the time that simultaneous position tracking signals are emitted from the transmitters 530 and 531. Further, since the geometric relationship between the object 510 and the transmitters 530 and 531 is known, the orientation of the object 510 at the time that the simultaneous position tracking signals are emitted can be determined from the locations of the transmitters 530 and 531 at that time.

Figure 6:
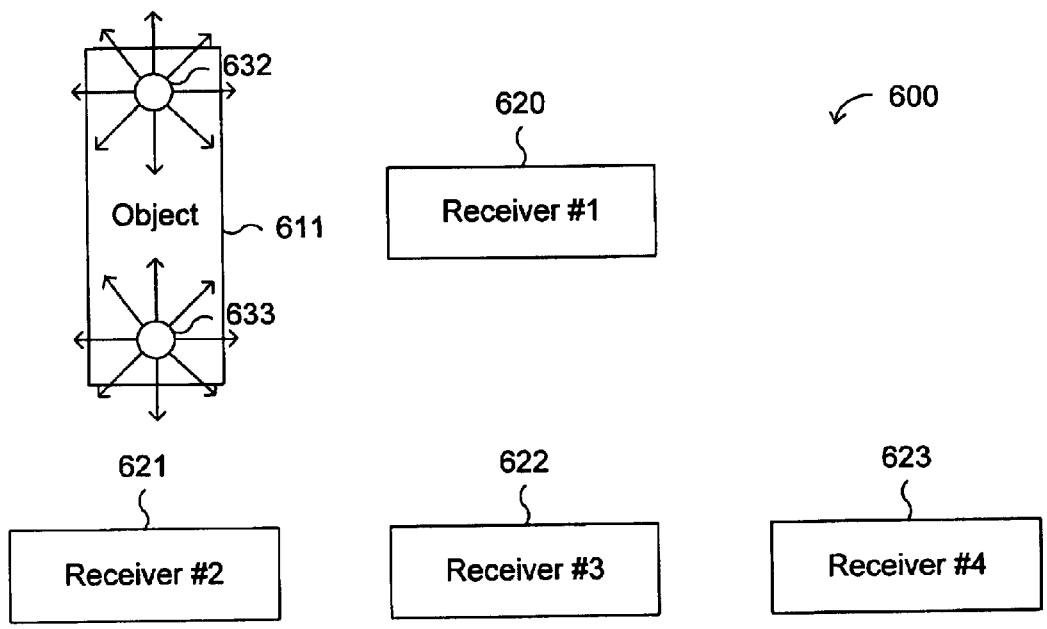
FIG. 6 is a diagram of a system, according to still another embodiment of the invention, that enables tracking of the locations and orientations of multiple objects.
Figure 6:
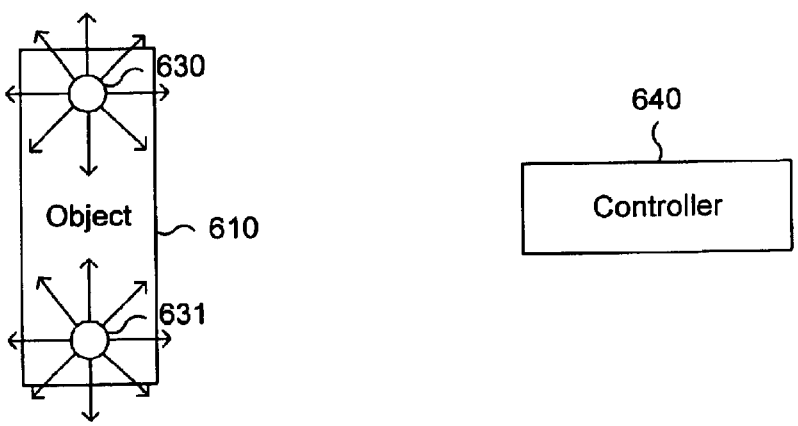

FIG. 6 is a diagram of a system 600 according to still another embodiment of the invention. Like the system 400 (FIG. 4), the system 600 enables tracking of the locations of multiple objects. Like the system 500 (FIG. 5), the system 600 enables tracking of both the location and orientation of an object. The system 600 combines the capabilities of the systems 400 and 500 to enable tracking of the locations and orientations of multiple objects. In FIG. 6, the system 600 tracks the locations and orientations of two objects: objects 610 and 611. However, generally, the system 600 can be used to track the locations and orientations of any number of objects. As will be appreciated, many aspects of the operation of the system 600 are the same as, or similar to, aspects of the operation of the systems 100 (FIG. 1), 400 (FIG. 4) and 500 (FIG. 5) described above.

The system 600 includes four receivers 620, 621, 622 and 623, four transmitters 630, 631, 632 and 633, and a controller 640. The receivers 620, 621, 622 and 623 (more than four receivers can be used) can be positioned at fixed and known positions with respect to a tracking space. The transmitters 630 and 631 are each coupled to the object 610 so that the transmitters 630 and 631 maintain a fixed and known positional relationship to the object 610, and the transmitters 632 and 633 are each coupled to the object 611 so that the transmitters 632 and 633 maintain a fixed and known positional relationship to the object 611.

The transmitters 630, 631, 632 and 633 emit position tracking signals that are received and recorded as time tagged detection events by the receivers 620, 621, 622 and 623. The transmitters 630, 631, 632 and 633, and the receivers 620, 621, 622 and 623 are implemented in a manner that enables the receivers 620, 621, 622 and 623 to ascertain from which transmitter 630, 631, 632 or 633 a received position tracking signal was transmitted. The controller 640 is adapted to determine, for each position tracking signal emitted by one of the transmitters 630, 631, 632 or 633, the location of the transmitter 630, 631, 632 or 633 at the time that the signal was emitted from the transmitter 630, 631, 632 or 633. Since the position tracking signals emitted by the transmitters 630, 631, 632 or 633 can be distinguished from each other, the location of the objects 610 and 611 can be determined. Further, by so determining the location of the transmitters 630 and 631, or the transmitters 632 and 633, for position tracking signals that were emitted simultaneously from the transmitters 630 and 631 or the transmitters 632 and 633, the locations of the transmitters 630 and 631 or the transmitters 632 and 633 relative to each other—and, therefore, the orientation of the corresponding objects 610 and 611—can be determined.

The transmitter 200 described above with respect to FIG. 2 can also be used with a system according to the invention including multiple transmitters, such as the systems 400, 500 and 600 described above. As described in more detail below, the transmitter 200 can be adapted to emit an identifiable signal that is unique to that transmitter, so that a receiver of the system can identify the transmitter from which a received signal was emitted. This can be accomplished by using a code word that is unique to the transmitter to generate a modulated signal as described above.

With slight modification, the receiver 300 described above with respect to FIG. 3 can also be used with a system according to the invention including multiple transmitters. The modified receiver is adapted to process a received signal to identify not only that the signal came from a transmitter that is part of a system according to the invention, but also the particular transmitter from which the signal came. (The transmitters used with such a system must be adapted to emit an identifiable signal, as mentioned above and discussed further below.) In general, the modified receiver operates in the same manner as that described above for the receiver 300. However, the code word filter 306 of the modified receiver includes a set of matching filters (rather than a single filter), one filter corresponding to each of the transmitters that are being used with the position tracking system.

The demodulated signal output from the demodulator 305 is processed by each of the matching filters, which operate in the same manner as described above, to identify a code word, if any, present in the demodulated signal, thereby resulting in identification of the transmitter from which a received signal was emitted.

As discussed above, the code word for a transmitter can be a binary sequence that is chosen to have "good" auto-correlation. For systems according to the invention including multiple transmitters, each transmitter must have a unique code word so that each transmitter can be uniquely identified, thus necessitating the generation of multiple unique code words. Therefore, it is not adequate to simply find the binary sequence of a specified length having the best auto-correlation, as can be done when a system according to the invention includes only a single transmitter. Rather, multiple binary sequences, each having good auto-correlation, must be identified. This can be accomplished by generating binary sequences at random and convolving each sequence to determine if the sequence has greater than a predetermined threshold auto-correlation. This determination can be made in any appropriate manner. For example, the RMS level of the dot products of the convolution can be calculated and compared to the dot product at the midpoint alignment of the two instantiations of the binary sequence; if the magnitude of the dot product at the midpoint alignment is greater than the RMS level by a predetermined percentage, then the auto-correlation is deemed to be good. Or, an auto-correlation can be deemed to be good if the magnitude of the dot product at the midpoint alignment is greater than the magnitude of the dot product at any other alignment by greater than a predetermined percentage.

Further, when there are multiple transmitters in a system according to the invention, the content of each code word is preferably as little like the content of other code words as possible, so that the receivers can unambiguously identify the transmitter from which a position tracking signal was emitted. When the code word is a binary sequence, as discussed above, the similarity between code words can be determined by cross-correlating the code words, in the same manner as done in determining an auto-correlation of a code word. Each pair of code words preferably has a low cross-correlation (i.e., the magnitude of the dot product at the midpoint alignment is not significantly larger than the dot product at other alignments). This can be ensured by determining, as part of the selection of a code word for a transmitter, whether the code word has less than a threshold cross-correlation with existing code words for other transmitters. If so, then—assuming that the code word has adequate auto-correlation—the code word is acceptable for use with that transmitter. The determination of whether a pair of code words has less than a threshold cross-correlation can be determined in any appropriate manner. For example, the RMS level of the dot products of the convolution can be calculated and compared to the dot product at the midpoint alignment of the two instantiations of the binary sequence; if the magnitude of the dot product at the midpoint alignment is not greater than the RMS level by a predetermined percentage, then the cross-correlation is deemed to be sufficiently low.

The complexity of the code words used by transmitters in a system according to the invention (e.g., when the code word is a binary sequence, as described above, the number of bits in the sequence) can be chosen in view of several considerations. For example, as the number of bits in a sequence becomes larger, it becomes easier to find bit sequences having good auto-correlation and low cross-correlation, particularly as the number of transmitters for which a code word must be generated increases. On the other hand, the computational cost of searching for bit sequences having good auto-correlation increases (though typically not by a large amount) as the number of bits increases.

A more significant detriment produced by long code words is associated with variation (stretching or compression) of the period of a position tracking signal as detected by a receiver (or, correspondingly, variation of the frequency of the received position tracking signal) from the period (or frequency) of the position tracking signal as produced by the transmitter, which variation can result from Doppler shift that is caused by relative movement between the transmitter and receiver. Such variation can affect the operation of both the code word filter 306 and the demodulator 305 (the effect on the latter depending upon the type of modulation used). In general, Doppler shift will degrade performance of a receiver if the shift in the period of the position tracking signal is comparable to the on symbol (bit) period position tracking signal, which, in turn, depends upon the length of the code word and the type of modulation used.

As discussed above with respect to FIG. 3, in a system including a single transmitter, a demodulated baseband signal can be extracted from the two output signals from the demodulator 305 by applying a detector and low pass filter to each of the output signals, or by squaring each of the output signals, adding the products and applying a low pass filter to the sum. In a system according to the invention including multiple transmitters, either of these approaches can also be used. However, in the first approach, multiple code words may be included in either of the signals that are output from a low pass filter. In the second approach, multiple code words can be amalgamated into the single signal that is output from the low pass filter. Thus, the second approach is preferable, since it requires only one signal to be processed by the filters of the code word filter 306, rather than two, as in the first approach.

Figure 7:
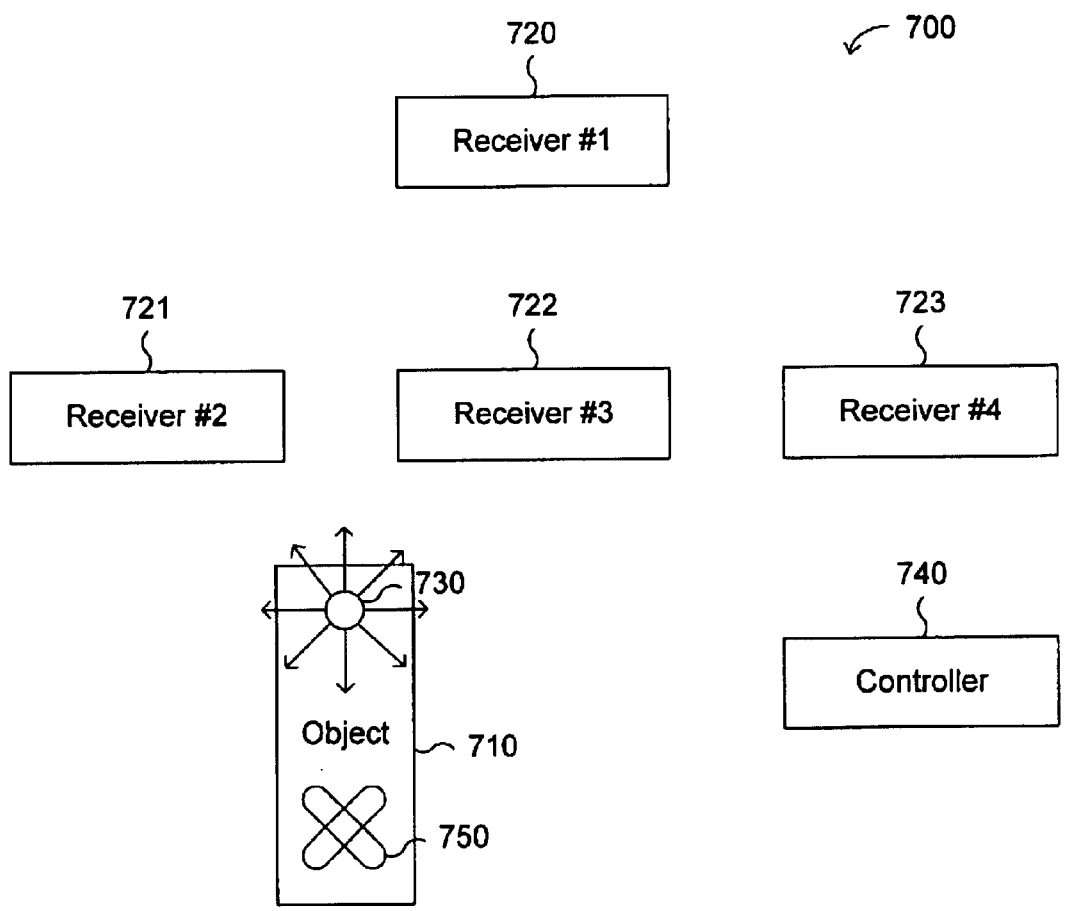
FIG. 7 is a diagram of a system, according to another embodiment of the invention, that enables tracking of the location of an object.

As indicated above, a controller for use with the invention must include an interface for communicating with receivers that has a communications bandwidth that is adequate to receive, during a time interval equal to the time interval between emission of position tracking signals from a transmitter, data from each receiver regarding the detection events recorded by that receiver. When a system according to the invention includes multiple receivers, such communications bandwidth, $B_C$, is given by equation (2):

$$B_C = [N_t * \text{ceiling}(\log_2(N_t)) * N_{cb} * N_r]/T_{period} \quad (2)$$

where
  $B_C$ = communications bandwidth
  $N_t$ = number of transmitters
  $N_{cb}$ = number of bits in a time tag clock value, and
  $N_r$ = number of receivers
  $T_{period}$ = time period between beginning of successive position tracking signals FIG. 7 is a diagram of a system 700 according to another embodiment of the invention. Like the system 100 (FIG. 1), the system 700 enables tracking of the location of an object (in FIG. 7, an object 710). In fact, as will be appreciated, some aspects of the operation of the system 700 are the same as, or similar to, aspects of the operation of the system 100. However, the system 700 can, in many cases, enable tracking of the location of an object to be accomplished with greater accuracy than can be provided by the system 100. The system 700 can accomplish this by exploiting the relative advantages of each of two position tracking subsystems that are part of the system 700.

The system 700 includes four receivers 720, 721, 722 and 723, a transmitter 730, an inertial device 750, and a controller 740. The receivers 720, 721, 722 and 723 can be positioned at fixed and known positions with respect to a tracking space. The transmitter 730 is coupled to the object 710 so that the transmitter 730 maintains a fixed and known positional relationship to the object 710. The inertial device 750 is also coupled to the object 710.

The transmitter 730 is adapted to emit a sequence of position tracking signals. The position tracking signals emitted by the transmitter 730 are received by each of the four receivers 720, 721, 722 and 723, such receptions being recorded by each receiver 720, 721, 722 or 723 as time tagged detection events using a time base that is synchronized among the receivers 720, 721, 722 and 723. The time tags are communicated to the controller 740, which uses the time tags to determine the location of the transmitter 730 (and, therefore, the object 710) at the times that position tracking signals were emitted from the transmitter 730. The transmitter 730, receivers 720, 721, 722 and 723, and controller 740, operating as described above, represent one position tracking subsystem in the system 700 (sometimes herein as the "transmitter/receiver position tracking subsystem").

The inertial device 750 is adapted to obtain information (sometimes referred to herein as "inertial tracking information") regarding the acceleration, velocity and/or position of the object 710, and represents a second position tracking subsystem in the system 700. The inertial device 750 can be implemented by one or more conventional inertial navigation devices (such as conventional gyroscopes and/or accelerometers) that directly measure the acceleration of the object 710 at particular times, together with a conventional integrating device that uses the acceleration measurements to determine the position and/or velocity of the object 710 at particular times.

The entire apparatus necessary to implement the inertial device 750 can be co-located with the object 710, making it unnecessary to communicate with devices remote from the object 710 in order to obtain location information regarding the object 710 (such as occurs in the transmitter/receiver position tracking subsystem, in which determination of the location of the object 710 necessitates transmission of a position tracking signal from the transmitter 730 to the receivers 720, 721, 722 and 723, and communication of time tags from the receivers 720, 721, 722 and 723 to the controller 740). Consequently, the inertial device 750 can produce location information (as well as other inertial tracking information) more quickly than can the transmitter/receiver position tracking subsystem.

The inertial device 750 ascertains the location (and/or velocity) of the object 710 based upon an acceleration measurement acquired by the inertial device 750 and an initial location (and/or velocity) at the time of the acceleration measurement. For typical devices used to implement the inertial device 750, the operation of the inertial device 750 (i.e., the determined location and/or velocity) is subject to drift over time that eventually renders the location and/or velocity information produced by the inertial device 750 unacceptably inaccurate. The duration of time for which the inertial device 750 produces sufficiently accurate location and/or velocity information varies with the quality of the devices used to implement the inertial device 750, as understood by those skilled in that art. For example, gyroscopes used in aircraft navigation are typically reliable for approximately 15 minutes or so. As another example, inertial devices that make use of microminiature accelerometers (such as can be made by appropriately processing a silicon wafer) may be reliable for only half a minute to a minute.

The transmitter/receiver position tracking subsystem, on the other hand, obtains very accurate position information that does not drift over time. However, as indicated above, the transmitter/receiver position tracking subsystem obtains that position information relatively slowly as compared to the inertial device 750, since communication must occur between devices that are remote from each other.

The system 700 can exploit the relative strengths of the two position tracking subsystems to result in an overall system that can track the location of an object more accurately than can either of the subsystems operating alone. The inertial tracking information can be used to determine the location of the object 710 at times intermediate those at which the transmitter/receiver position tracking subsystem determines the location of the object 710 (i.e., times intermediate the times at which a position tracking signal is emitted from the transmitter 730), thus enabling a fuller set of location information to be obtained than would be possible if the inertial device 750 was not used. Additionally, the location information determined by the transmitter/receiver position tracking subsystem can be communicated to the inertial device 750 as that location information is determined by the controller 740, thus periodically supplying to the inertial device 750 a highly accurate initial location for use in determining location and/or velocity information, and thereby providing an ongoing correction of any drift that would otherwise degrade the accuracy of the inertial device 750.

The inertial device can enable the fuller set of location information to be obtained using one or both of two characteristics of the inertial device 750: i) the relatively rapid determination of location information, and ii) the determination of the velocity of the object 710, in addition to the location of the object 710. For example, the relatively rapid determination of location information by the inertial device 750 means that the inertial device 750 and the transmitter/receiver position tracking subsystem may be implemented so that the inertial device 750 obtains location information at intervals that are shorter in duration than the intervals at which location information can be determined by the transmitter/receiver position tracking subsystem. The inertial tracking information can therefore be used directly to ascertain the location of the object 710 at times intermediate the times at which a position tracking signal was emitted from the transmitter 730. The inertial device 750 can also determine the acceleration of the object 710 at particular points in time. This acceleration information can be used to produce estimates of the location of the object 710 at times other than times at which the location is obtained directly (either by the inertial device 750 or the transmitter/receiver position tracking subsystem), thus enabling a fuller set of location information to be obtained without having to enhance the inertial device 750 or the transmitter/receiver position tracking subsystem to enable the acquisition of more location information directly.

To enable use of the inertial device 750 and the transmitter/receiver position tracking subsystem as described above, the various devices of the system 700 must be enabled to appropriately communicate with each other. The inertial device 750 and transmitter 730 are adapted to enable communication of inertial tracking information from the inertial device 750 to the transmitter 730. The transmitter 730 is adapted to transmit to the receivers 720, 721, 722 and 723, with each position tracking signal, a signal that represents inertial tracking information. The receivers 720, 721, 722 and 723 are, in turn, adapted to transmit those signals to the controller 740, as described above. The controller 740 and inertial device 750 can be adapted to enable communication from the controller 740 to the inertial device 750 of the locations determined using the position tracking signals.

Figure 8:
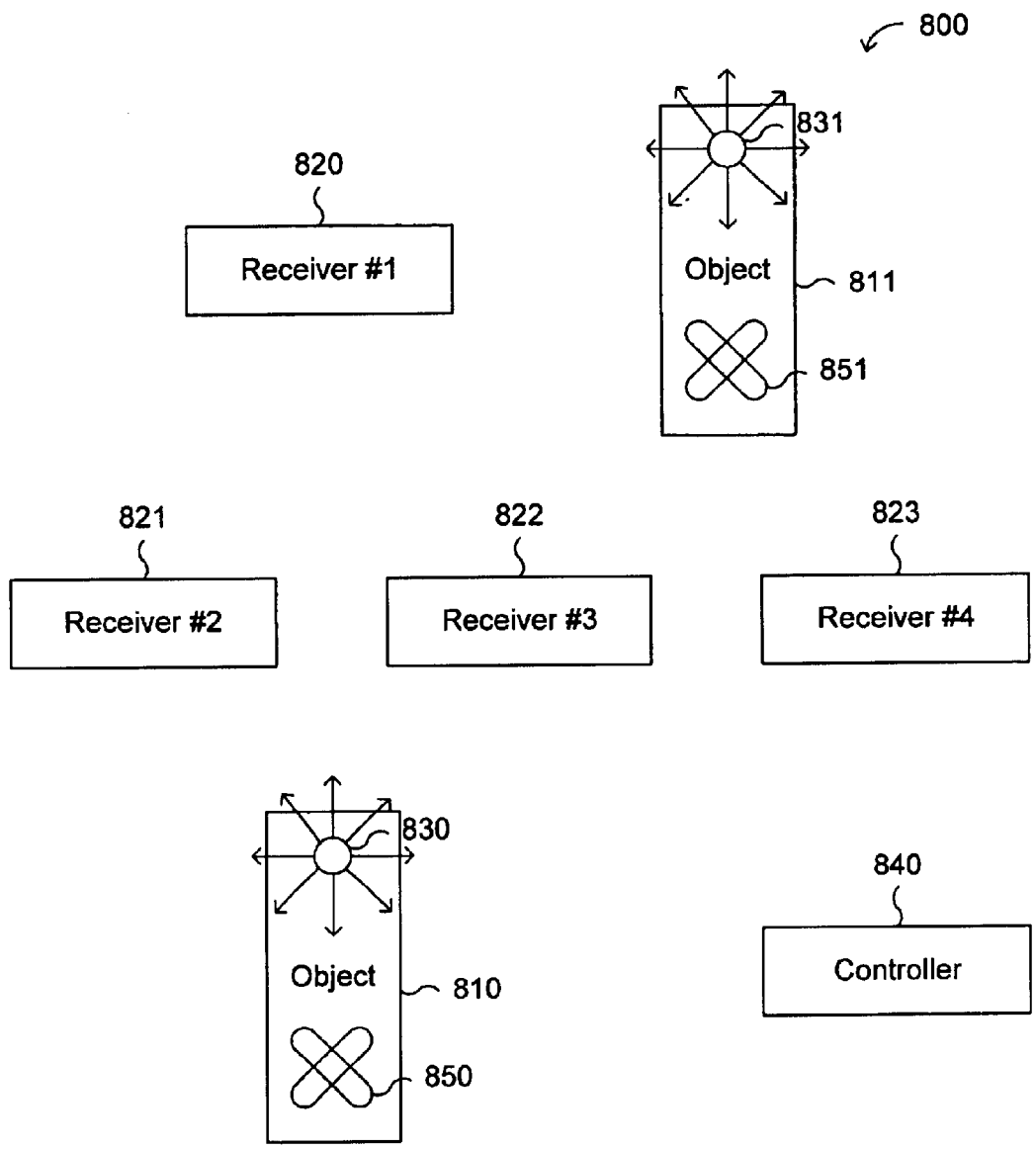
FIG. 8 is a diagram of a system, according to yet another embodiment of the invention, that enables tracking of the locations of multiple objects.

FIG. 8 is a diagram of a system 800 according to yet another embodiment of the invention. Like the system 400 (FIG. 4), the system 800 enables tracking of the locations of multiple objects. As will be appreciated, some aspects of the operation of the system 800 are the same as, or similar to, aspects of the operation of the system 400. However, in a manner similar to that described above with respect to the system 700 (FIG. 7), the system 800 can, in many cases, enable such tracking to be accomplished with greater accuracy than is provided by the system 400. In FIG. 8, the system 800 tracks the locations of two objects: objects 810 and 811. However, generally, the system 800 can be used to track the locations of any number of objects.

The system 800 includes four receivers 820, 821, 822 and 823, two transmitters 830 and 831, two inertial devices 850 and 851, and a controller 840. The receivers 820, 821, 822 and 823 can be positioned at fixed and known positions with respect to a tracking space. The transmitters 830 and 831 are coupled to the objects 810 and 811, respectively, so that the transmitters 830 and 831 each maintain a fixed and known positional relationship to the corresponding object 810 or 811. The inertial devices 850 and 851 are also coupled to the objects 810 and 811, respectively.

The transmitters 830 and 831 are each adapted to emit a sequence of position tracking signals. The position tracking signals are received by each of the four receivers 820, 821, 822 and 823, such receptions being recorded by each receiver 820, 821, 822 or 823 as time tagged detection events using a time base that is synchronized among the receivers 820, 821, 822 and 823. The transmitters 830 and 831, and the receivers 820, 821, 822 and 823 are implemented in a manner that enables the receivers 820, 821, 822 and 823 to ascertain from which transmitter 830 or 831 a received position tracking signal was transmitted. The time tags are communicated to the controller 840, which uses the time tags to determine the locations of the transmitters 830 and 831 (and, therefore, the corresponding objects 810 and 811) at the times that position tracking signals were emitted from the transmitters 830 and 831. The transmitters 830 and 831, receivers 820, 821, 822 and 823, and controller 840, operating as described above, represent a transmitter/receiver position tracking subsystem in the system 800.

The inertial devices 850 and 851 are each adapted to obtain inertial tracking information regarding the object 810, and represent a second position tracking subsystem in the system 800.

As described above, the inertial devices 850 and 851 can produce location information (as well as other inertial tracking information) more quickly than can the transmitter/receiver position tracking subsystem. However, the transmitter/receiver position tracking subsystem can obtain more accurate position information, over time, than can the inertial devices 850 and 851. The two position tracking subsystems can be integrated, in a manner similar to that described above with respect to FIG. 7, to exploit the relative strengths of the two position tracking subsystems to result in an overall system that can track the locations of multiple objects more accurately than can either of the subsystems operating alone. As above, the inertial tracking information can be used to determine the locations of the objects 810 and 811 at times intermediate those at which the transmitter/receiver position tracking subsystem determines the locations of the objects 810 and 811, thus enabling a fuller set of location information to be obtained than would be possible if the inertial devices 850 and 851 were not used. Additionally, the location information determined by the transmitter/receiver position tracking subsystem can be communicated to the inertial devices 850 and 851 to enable periodic recalibration of the inertial devices 850 and 851, thereby providing an ongoing correction of any drift that would otherwise degrade the accuracy of the inertial devices 850 and 851.

In the systems 700 (FIG. 7) and 800 (FIG. 8) described above, the location of one or more objects is tracked. The orientation of the object or objects can also be tracked, in addition to the location, by adding an additional transmitter to each object, in a manner similar to that described above with respect to the systems 500 (FIG. 5) and 600 (FIG. 6), as can be readily appreciated and implemented by those skilled in the art in view of the description herein.

In the embodiments of a system according to the invention described above, the receivers are positioned at fixed and known positions with respect to a defined space (the tracking space) within which the location of an object is being tracked. However, it should be noted that, in such embodiments, the positions of the receivers themselves can be moving (relative to a second defined space) when the location of an object is being tracked relative to a tracking space that is moving. This might occur, for example, if the system is being used to track the location of an object in a moving vehicle.

Further, in the above-described embodiments of a system according to the invention, the positions of the receivers need only be known before the system is used to track the position of an object. These positions can be determined external to the system (e.g., measured by a person) and made available to a controller prior to use of the system. Alternatively, the system can be used to determine the positions of the receivers. This can be done, for example, by positioning one or more of the transmitters of the system at one or more positions and causing the transmitter(s) to emit a position tracking signal at each position, the positions of the receivers being determined (using, for example, a set of hyperbolic equations, as described above) from the detection events associated with each position tracking signal. The number of position tracking signals must be at least one greater than the number of spatial dimensions in which it is desired to determine the positions of the receivers, e.g., if the positions of the receivers in three dimensions are desired, four position tracking signals (emitted from different positions) must be emitted. This number of position tracking signals can be produced in any manner, e.g., by emitting the required number of signals from a single transmitter positioned at different positions, by emitting a single signal from multiple (the number being greater than or equal to the required number) differently positioned transmitters, or by any other appropriate combination of emitting one or more signals from one or more transmitters.

Figure 9:
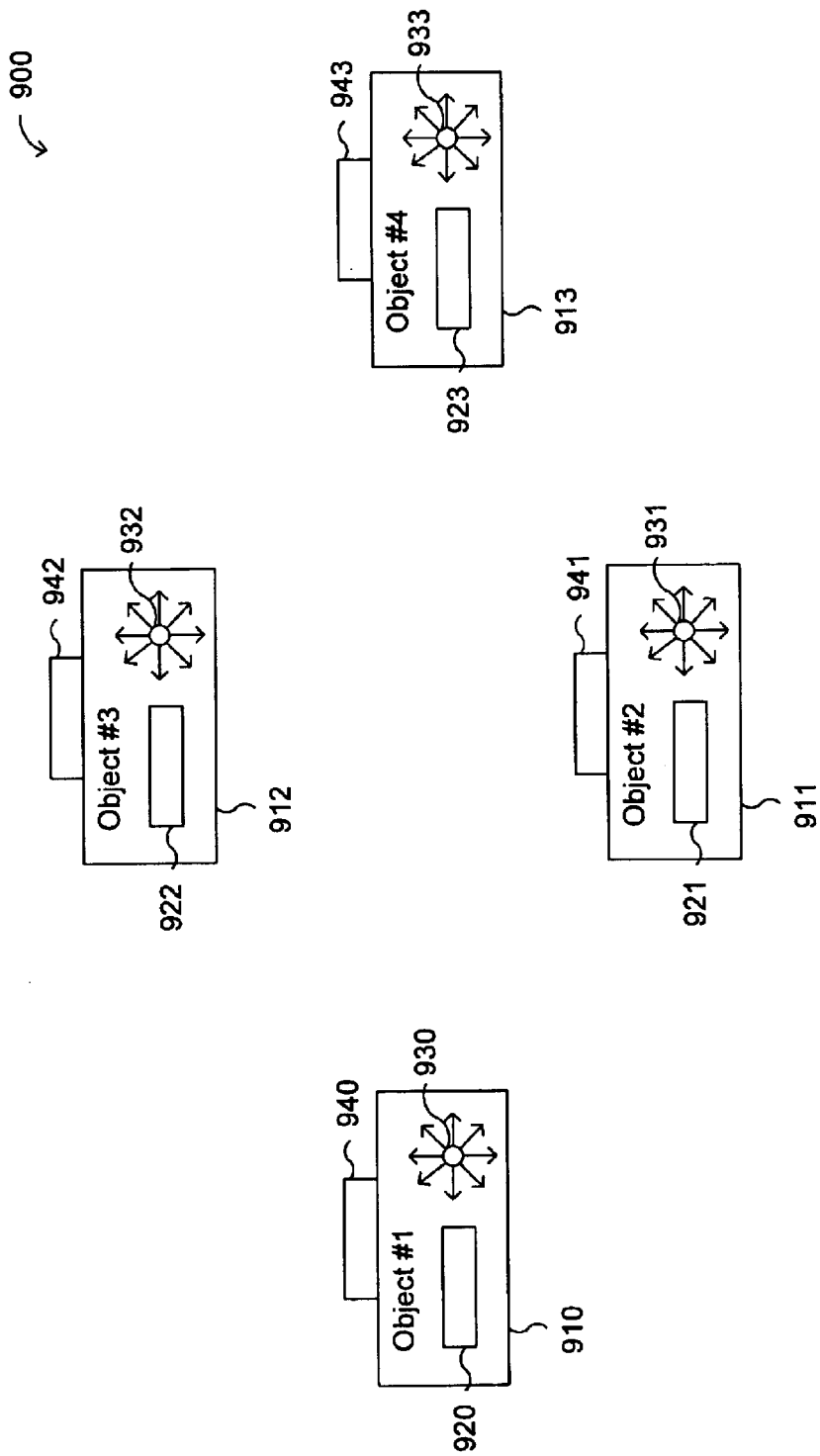
FIG. 9 is a diagram of a system, according to another embodiment of the invention, that enables tracking of the locations of multiple objects.
Figure 10:
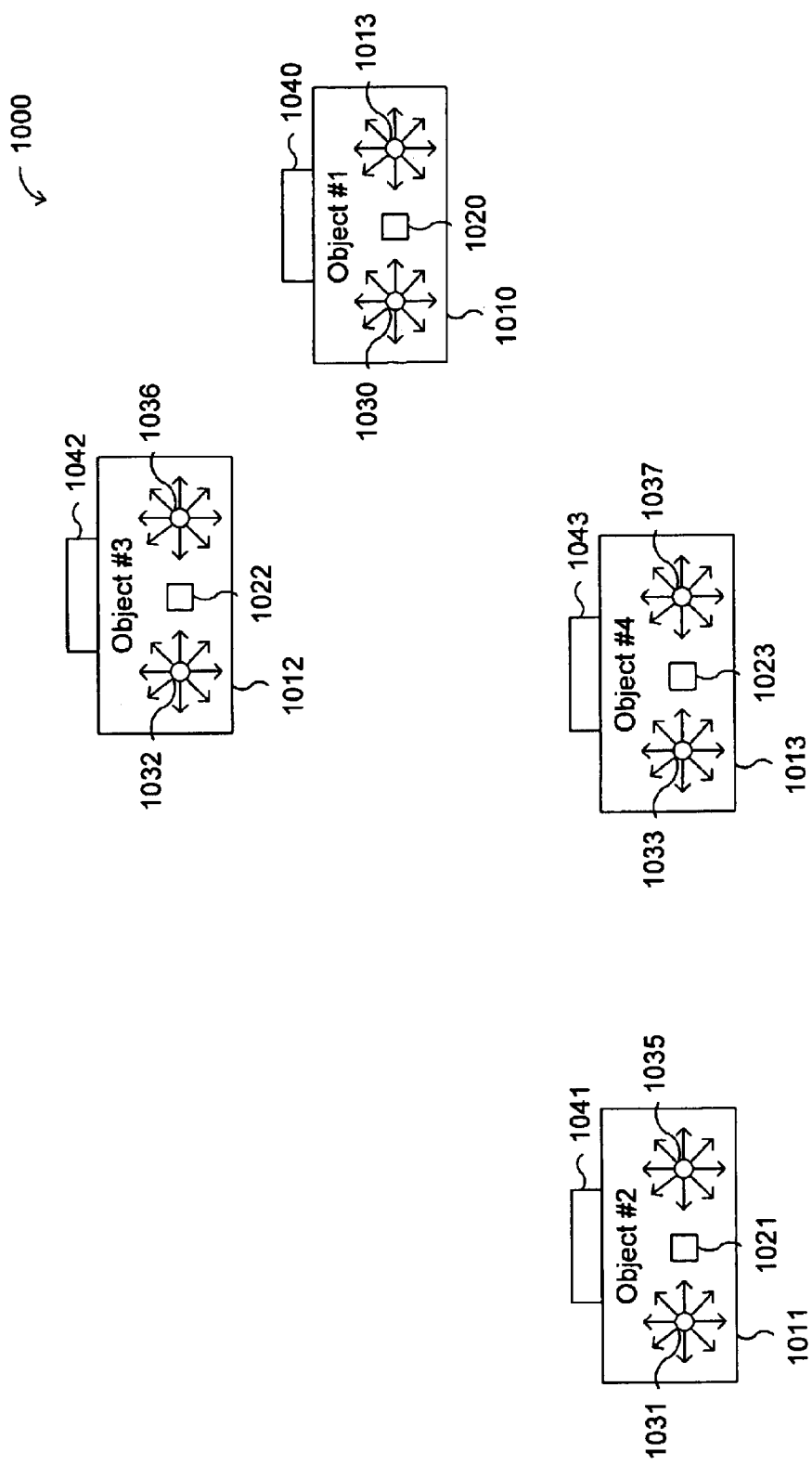
FIG. 10 is a diagram of a system, according to yet another embodiment of the invention, that enables tracking of the locations and orientations of multiple objects.
Figure 11:
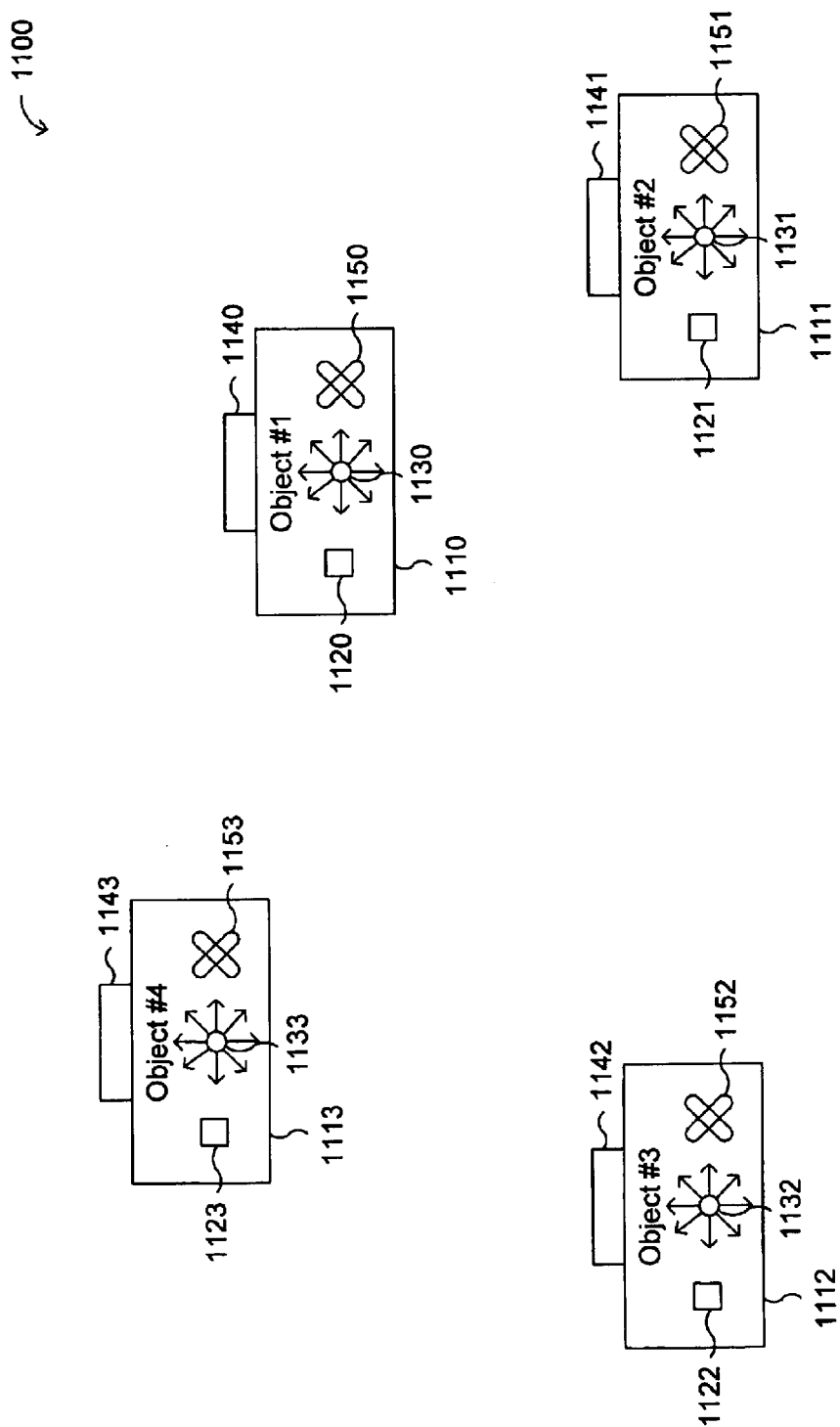
FIG. 11 is a diagram of a system, according to still another embodiment of the invention, that enables tracking of the locations of multiple objects.

In other embodiments of a system according to the invention, the receivers, like the transmitters, can move with respect to the tracking space. FIGS. 9 through 11, described below, illustrate several such embodiments.

FIG. 9 is a diagram of a system 900 according to another embodiment of the invention. The system 900 can enable tracking of the locations of multiple objects. In FIG. 9, the system 900 tracks the locations of four objects: objects 910, 911, 912 and 913. However, generally, a system according to the invention implemented in accordance with the principles discussed herein can be used to track the locations of any number of objects.

The system 900 includes four transmitters 930, 931, 932 and 933 and four receivers 920, 921, 922 and 923 adapted to emit and receive signals, respectively, as described above for embodiments of the invention including multiple transmitters (i.e., each emitted signal must be uniquely identifiable as having been emitted from a particular one of the transmitters 930, 931, 932 and 933.) Each of the transmitters 930, 931, 932 and 933 and each of the receivers 920, 921, 922 and 923 are coupled to a corresponding one of the objects 910, 911, 912 and 913 (one receiver/transmitter pair per object) so that the transmitters 930, 931, 932 and 933 and receivers 920, 921, 922 and 923 maintain a fixed and known positional relationship to the corresponding object 910, 911, 912 or 913.

As illustrated in FIG. 9, the system 900 also includes four controllers 940, 941, 942 and 943. Each of the controllers 940, 941, 942 and 943 is also coupled to a corresponding one of the objects 910, 911, 912 and 913.

Each of the transmitters 930, 931, 932 and 933 includes a clock that is synchronized with respect to the clocks of the other transmitters 930, 931, 932 and 933, as described above with respect to the transmitters 530 and 531 of the system 500 (FIG. 5). During operation of the system 900, the transmitters 930, 931, 932 and 933 are controlled to emit position tracking signals at the same time.

Each of the receivers 920, 921, 922 and 923 is adapted to record time-tagged detection events (i.e., the time of receipt of a position tracking signal emitted by a particular transmitter 930, 931, 932 or 933), as described with respect to the embodiments of the invention above. Like the transmitters 930, 931, 932 and 933, each of the receivers 920, 921, 922 and 923 includes a clock that is synchronized with respect to the clocks of the other receivers 920, 921, 922 and 923, so that the time-tagged detection events can be meaningfully related to each other.

The receivers 920, 921, 922 and 923 and controllers 940, 941, 942 and 943 are adapted to enable communication therebetween, so that each of the receivers 920, 921, 922 and 923 can communicate the time tags recorded by that receiver 920, 921, 922 or 923 to each of the controllers 940, 941, 942 and 943. This can be accomplished using the devices and methods as described above for enabling communication between a receiver and a controller. Or, if the magnitude of the duty cycle of the position tracking signal is sufficiently low, taken in combination with the required data communications bandwidth (see equation (3) below), the transmitter associated with each receiver can be used to transmit the time tags to the controllers. The required data communications bandwidth, $B_C$, between each receiver and controller is given by equation (3):

$$B_C = [3N_o * \text{ceiling}(\log_2(N_o)) * N_{cb}]/T_{period} \quad (3)$$

where $B_C$=communications bandwidth $N_o$=number of objects (transmitter/receiver pairs)

$N_{cb}$=number of bits in a time tag clock value, and $T_{period}$=time period between beginning of successive position tracking signals The controllers 940, 941, 942 and 943 are each adapted, as described further below, to use time tagged detection events recorded by the receivers 920, 921, 922 or 923 to determine locations of the objects 910, 911, 912 and 913. However, since the receivers 920, 921, 922 or 923 can move at any time (and, in particular, after emission of a signal by a transmitter and before receipt of that signal by the receiver), the controllers 940, 941, 942 and 943 can only determine the locations of the objects 910, 911, 912 and 913 relative to each other, rather than within a tracking space as in the embodiments of the invention described above.

Since the receivers 920, 921, 922 and 923 can move, the method used by the controllers 940, 941, 942 and 943 to determine the locations of the transmitters 930, 931, 932 and 933 is modified from that described above. In particular, the hyperbolic equations are iteratively solved to enable determination of the locations of the transmitters 930, 931, 932 and 933.

FIG. 10 is a diagram of a system 1000 according to yet another embodiment of the invention. The system 1000 can enable tracking of the locations and orientations of multiple objects. In FIG. 10, the system 1000 tracks the location of four objects: objects 1010, 1011, 1012 and 1013. However, generally, a system according to the invention implemented in accordance with the principles discussed herein can be used to track the locations and orientations of any number of objects.

The system 1000 includes four transmitters 1030, 1031, 1032 and 1033, four receivers 1020, 1021, 1022 and 1023 and four controllers 1040, 1041, 1042 and 1043 that are constructed and operate in the same manner as the corresponding devices in the system 900 described above. In the system 1000, a second transmitter 1034, 1035, 1036 or 1037 is coupled to each object 1010, 1011, 1012 and 1013, respectively, so that the transmitters 1034, 1035, 1036 and 1037 maintain a fixed and known positional relationship to the corresponding object 1010, 1011, 1012 and 1013. The transmitters 1034, 1035, 1036 and 1037 are controlled synchronously with the transmitters 1030, 1031, 1032 and 1033 to emit position tracking signals. The time-tagged detection events recorded by the receivers 1020, 1021, 1022 and 1023 that correspond to the position tracking signals emitted by the transmitters 1034, 1035, 1036 and 1037 are used to determine the location of the transmitters 1034, 1035, 1036 and 1037, which locations can be used, in the same manner as described above with respect to the system 500 (FIG. 5), to determine the orientation of the objects 1010, 1011, 1012 and 1013, in addition to the location of the objects 1010, 1011, 1012 and 1013.

FIG. 11 is a diagram of a system 1100 according to still another embodiment of the invention. Like the system 900 (FIG. 9), the system 1100 enables tracking of the locations of multiple objects. As will be appreciated, some aspects of the operation of the system 1100 are the same as, or similar to, aspects of the operation of the system 900. However, in a manner similar to that described above with respect to the systems 700 (FIG. 7) and 800 (FIG. 8), the system 1100 can enable such tracking to be accomplished with greater accuracy than is provided by the system 900. In FIG. 11, the system 1100 tracks the locations of four objects: objects 1110, 1111, 1112 and 1113. However, generally, a system according to the invention implemented in accordance with the principles discussed herein can be used to track the locations of any number of objects.

The system 1100 includes four transmitters 1130, 1131, 1132 and 1133, four receivers 1120, 1121, 1122 and 1123 and four controllers 1140, 1141, 1142 and 1143 that, in general, are constructed and operate in the same manner as the corresponding devices in the system 900 described above, and represent a first position tracking subsystem (the transmitter/receiver position tracking subsystem). The system 1100 also includes inertial devices 1150, 1151, 1152 and 1153 that are coupled to the objects 1010, 1011, 1012 and 1013, respectively. The inertial devices 1150, 1151, 1152 and 1153 are constructed and operate to obtain inertial tracking information in the same manner as described above for the inertial devices of the systems 700 (FIG. 7) and 800 (FIG. 8) described above, and represent a second position tracking subsystem. The position tracking subsystems can interact as described above with respect to FIGS. 7 and 8 to enable more accurate location information to be obtained than would be obtained using either system alone.

The system 1100 could be modified so that a second transmitter is coupled to each of the objects 1110, 1111, 1112 and 1113, thereby enabling the orientation of the objects 1110, 1111, 1112 and 1113 to be tracked, in addition to the location, in a manner similar to that described above with respect to, for example, the system 1000 (FIG. 10), as can be readily appreciated and implemented by those skilled in the art in view of the description herein.

The systems 900 (FIG. 9), 1000 (FIG. 10) and 1100 (FIG. 11) could be modified so that a single controller replaces the controllers associated with each object, e.g., in the system 900, the controllers 940, 941, 942 and 943. In such a system, the receivers and controller can communicate as described above so that the time tags are communicated from the receivers to the controller. The system could be implemented in one of two ways.

In the first approach, the receivers could include a memory device that enables the time tags to be stored so that the time tags can be transferred to the controller after operation of the system is complete. In such a system, the data communications bandwidth between the receivers and controller is typically of little or no concern, since the system is not being used to determine location information in real time, so that as much time as is needed (within reason) can be used to transfer the time tag data to the controller.

In the second approach, the receivers transfer the time tag data to the controller immediately or soon after the time tag data is obtained so that the location information can be determined in real time. The required data communications bandwidth is the same as that described above with respect to the system 900.

The system 900 (FIG. 9), 1000 (FIG. 10) or 1100 (FIG. 11) could be implemented with a set of video cameras to enable tracking of the location and/or orientation of the video cameras (which would be the "objects" in the system 900, 1000 or 1100). Such a system enables the controller or controllers of the system to know the position of each video camera (and thus the content of the filmed scenes of those video cameras). The controller(s) can then use this information as input to a method for controlling the video cameras, thereby enabling real-time, automatic control of the video cameras. For example, a camera control method could be implemented that prevents any of the cameras from filming the same content at the same time. Or, a camera control method could be implemented that controls each of the other video cameras to film from a particular location and/or orientation the same content being filmed by one of the video cameras.

As indicated above, a transmitter in a system according to the invention is coupled to a corresponding object so that the transmitter maintains a fixed and known positional relationship to that object. In a typical application of the invention, this can easily and acceptably be accomplished by rigidly attaching the transmitter to the object, using any of a variety of well-known techniques, as appropriate. In embodiments of the invention in which a receiver is also coupled to an object, such coupling can likewise be accomplished by such rigid attachment.

Above, embodiments of the invention are described that include four receivers (or, in embodiments of the invention in which the receivers can move, four receiver/transmitter pairs), that being the minimum number of receivers (or receiver/transmitter pairs) required to enable tracking of the position of an object in three dimensions. The principles of the invention can also be used with systems for tracking the position of one or more objects in which the system includes three receivers (or receiver/transmitter pairs). Such systems would be constructed and operate in a manner similar to that described above for systems including four receivers (or receiver/transmitter pairs), the operation differing to account for the presence of three receivers (or receiver/transmitter pairs), rather than four. Such systems can enable tracking of the position of one or more objects in two dimensions, i.e., in a plane of a particular orientation.

Further, the principles of the invention can also be used with systems for tracking the position of one or more objects in which the system includes two receivers (or receiver/transmitter pairs), such systems being constructed and operating in a manner similar to that described above for systems including four receivers (or receiver/transmitter pairs). Such systems can enable tracking of the position of an object in one dimension, i.e., along an axis of a particular orientation. To enable tracking in one dimension, the locations of the two receivers (or receiver/transmitter pairs) must not be coincident. If the locations of the two receivers (or receiver/transmitter pairs) are coincident, then the system cannot track the position of the object.

Receivers in addition to the number needed to enable tracking in the desired number of dimensions can be used and may increase the accuracy of the position information determined by the system according to the invention. This is so because, in solving the hyperbolic equations that determine the location of a transmitter, the additional receivers further constrain the ellipsoidal volume that defines the space within which the transmitter must be located.

Various embodiments of the invention have been described. The descriptions are intended to be illustrative, not limitative. Thus, it will be apparent to one skilled in the art that certain modifications may be made to the invention as described above without departing from the scope of the claims set out below.

I claim:

1. A system for tracking the position of multiple objects, comprising:

a plurality of transmitters each adapted to emit a sequence of position tracking signals, wherein the position tracking signals emitted by a particular transmitter of the plurality of transmitters can be identified as having been emitted by that transmitter, and wherein each of the plurality of transmitters is coupled to a corresponding one of the objects so that the transmitter maintains a fixed and known positional relationship to the object, each of the plurality of transmitters further comprising:

a clock that is synchronized in time with respect to the clock of each other transmitter of the plurality of transmitters; and means for synchronizing the emission of a signal with the emission of a signal by each other transmitter of the plurality of transmitters;

a plurality of receivers each adapted to receive position tracking signals emitted by a transmitter, the receipt of a position tracking signal constituting a detection event, wherein each of the plurality of receivers is coupled to a corresponding one of the objects so that the receiver maintains a fixed and known positional relationship to the object, each of the plurality of receivers further comprising:
- a clock that is synchronized in time with respect to the clock of each other receiver of the plurality of receivers;
- means for recording the time of a detection event based upon the time of the clock;
- means for identifying the transmitter associated with the detection event; and
- means for communicating with a controller, wherein one or more recorded times of a detection event and the identity of the associated transmitter can be communicated to the controller; a controller, comprising:
  - means for communicating with each of the plurality of receivers, wherein recorded times of detection events and the identities of the associated transmitters can be communicated from each of the plurality of receivers; and
  - means for determining, based upon the recorded times of detection events and identities of the associated transmitters, positions of the objects;

a plurality of inertial devices, each of the plurality of inertial devices adapted to obtain inertial tracking information and coupled to one of the objects, each of the plurality of inertial devices further comprising:
- means for communicating with a transmitter coupled to the same object, wherein the inertial tracking information can be communicated from the inertial device to the transmitter; and
- means for communicating with a controller, wherein position information can be communicated from the controller to the inertial device; and wherein:
  - each transmitter coupled to an object together with an inertial device is adapted to emit position tracking signals that can include inertial tracking information obtained by the inertial device and further comprises means for communicating with the inertial device, wherein inertial tracking information can be communicated from the inertial device to the transmitter;
  - each of the plurality of receiver's means for communicating with a controller can also communicate inertial tracking information, if any, to the controller;
  - the controller's means for communicating the receivers can also enable inertial tracking information to be communicated from the receivers;
  - the controller's means for determining can determine a position of an object based on inertial tracking information; and
  - the controller further comprises means for communicating with an inertial device, wherein position information determined using the recorded detection events can be communicated to the inertial device.

2. A system as in claim 1, wherein a pair of transmitters are coupled to each object, the controller further comprising means for determining, based upon the recorded times of detection events and the identities of the associated transmitters, the orientation of one or more of the objects.

3. A system as in claim 1, wherein the plurality of receivers comprises at least two receivers and the plurality of transmitters comprises at least two transmitters, whereby the system can track the positions of the objects.

4. A system as in claim 1, wherein the position tracking signals are ultrasound signals.

* * * * *